(12) United States Patent
Ogielski et al.

(10) Patent No.: US 9,137,033 B2
(45) Date of Patent: Sep. 15, 2015

(54) METHODS AND SYSTEMS FOR MONITORING NETWORK ROUTING

(75) Inventors: Andrew T. Ogielski, Etna, NH (US); James H. Cowie, Deering, NH (US); Alin Popescu, Hanover, NH (US)

(73) Assignee: Dynamic Network Services, Inc., Manchester, NH (US)

( * ) Notice: Subject to any disclaimer, the term of this patent is extended or adjusted under 35 U.S.C. 154(b) by 405 days.

(21) Appl. No.: 13/421,399

(22) Filed: Mar. 15, 2012

(65) Prior Publication Data

US 2012/0290716 A1    Nov. 15, 2012

(51) Int. Cl.
*H04L 12/24* (2006.01)
*H04L 12/26* (2006.01)
*H04L 12/701* (2013.01)

(52) U.S. Cl.
CPC ............ *H04L 12/24* (2013.01); *H04L 12/2602* (2013.01); *H04L 41/00* (2013.01); *H04L 41/064* (2013.01); *H04L 41/065* (2013.01); *H04L 43/00* (2013.01); *H04L 43/065* (2013.01); *H04L 45/00* (2013.01); *H04L 43/024* (2013.01); *H04L 43/045* (2013.01); *H04L 43/067* (2013.01); *H04L 43/0811* (2013.01); *H04L 43/106* (2013.01); *H04L 43/16* (2013.01)

(58) Field of Classification Search
CPC ......... H04L 43/08; H04L 43/16; H04L 45/00; H04L 12/24; H04L 12/2602; H04L 41/00; H04L 41/064

USPC .......................................................... 709/203
See application file for complete search history.

(56) References Cited

U.S. PATENT DOCUMENTS

| | | | | |
|---|---|---|---|---|
| 6,643,613 | B2 * | 11/2003 | McGee et al. ................ | 702/186 |
| 6,981,055 | B1 * | 12/2005 | Ahuja et al. .................. | 709/238 |
| 7,349,994 | B2 * | 3/2008 | Balonado et al. ............. | 709/250 |
| 7,711,846 | B2 * | 5/2010 | Padmanabhan et al. ...... | 709/238 |
| 2002/0141343 | A1 * | 10/2002 | Bays ............................. | 370/235 |
| 2002/0184393 | A1 * | 12/2002 | Leddy et al. .................. | 709/250 |
| 2003/0120769 | A1 * | 6/2003 | McCollom et al. ........... | 709/224 |
| 2004/0088386 | A1 * | 5/2004 | Aggarwal ..................... | 709/220 |

* cited by examiner

*Primary Examiner* — Arvin Eskandarnia
(74) *Attorney, Agent, or Firm* — Cooley LLP

(57) ABSTRACT

The disclosed methods and systems include collecting routing data from a plurality of network routers, and correlating the routing data across routers and across time to obtain network data. The network data can be streamed to a user in real-time and the user can interactively query the data. In one embodiment, interactive routing analyses, drill-down, and forensics can be performed using a repository of Border Gateway Protocol (BGP) update traffic. Alarms can be set to detect selected routing problems. In setting the alarms, the message data for each router can be processed in timestamp order. Current message data from each router can be compared with previous message data to determine a condition status. An alarm can be provided when the condition status meets a temporal correlation criterion and/or a spatial correlation criterion. Based on the computed instability metrics for individual network prefixes and on a common property of those prefixes, a group instability metric for a group of network prefixes can be computed.

13 Claims, 12 Drawing Sheets routing scorecard®

My Portfolio

Organizations  [e.g. CMS]  [Get Rating]    Regions

1122 →                    1124 →

| Name | Score | Change |
|---|---|---|
| Yahoo! | 94.9 | |
| US Department of Justice (DOJ) | 80.8 | ↓ -4.2 |
| eBay Inc | 97.8 | |
| US Department of the Treasury | 85.3 | |
| General Motors Corporation | 83.4 | |
| Cogent Communications | 91.2 | 0.1 |
| US Department of Energy (DOE) | 83.7 | 31.2 |
| Goldman Sachs | 92.5 | |
| WINS, LLC | 49.5 | |
| Western Illinois Network | 80.1 | |
| Amnet Datos El Salvador | 79.6 | |

Portfolio Settings Help Logout
Welcome, New User

1126 →        1128 →

| Name | Score | Change |
|---|---|---|
| United States | 84.2 | -0.7 |
| Virginia | 84.9 | -0.4 |
| Texas | 82.7 | ↓ -1.8 |
| District of Columbia | 84.4 | -0.1 |
| Massachusetts | 85.6 | 0.1 |

FIG. 11B

METHODS AND SYSTEMS FOR MONITORING NETWORK ROUTING

RELATED APPLICATIONS

U.S. patent application Ser. No. 10/803,767, which was filed on Mar. 18, 2004, and issued as U.S. Pat. No. 8,161,152, and U.S. Provisional Patent Application No. 60/455,722, filed on Mar. 18, 2003, are incorporated herein by reference in their respective entireties.

BACKGROUND (1) Field

The disclosed methods and systems relate to monitoring network routing, and more particularly to monitoring, collecting, analyzing and presenting to users network data from a plurality of network routers.

(2) Description of Relevant Art

Though transparent to most users, the global routing infrastructure, as characterized by the Internet and World Wide Web (WWW) is not a fully automated system. It can depend on the constant efforts of large numbers of network operators and engineers around the world. Accidental misconfigurations and failures can and do happen regularly, and deliberate infrastructure attacks are an ever-present danger. External Border Gateway Protocol (BGP) routing problems endanger seamless operation of extranets, virtual private networks (VPNs), portals, logistics chains, network-delivered services and other distributed IT systems. Typically, existing network monitoring solutions can be limited to monitoring an organization's internal routers. Such monitoring does not afford an opportunity to observe dynamic changes of the routes that other nodes on the network take to access the organization's routers.

BGP routing is a critical part of the global communications infrastructure. Because BGP provides the mechanics for global redistribution of routing information, failures in BGP due to misconfigurations, hardware problems, router software bugs, and network attacks can have serious and costly impacts on any networked enterprise. In general, the global Internet can be composed of Autonomous Systems (ASes) glued together using BGP. The ASes can include independently administered IP networks, ranging in size from global enterprises with thousands of big routers to tiny operations with a single PC router. There is no global coordination of BGP routes. Instead, BGP routers choose and re-announce routes according to the local administrative policy applied to routing messages it receives from its neighbors. The policy coordination is generally limited to neighboring ASes, and thus BGP routes are constructed piecewise, from AS to AS. Well-managed ASes coordinate their policies, while other ASes can become a source of problems that can spread worldwide.

The design of BGP (version 4) is based on the Internet environment of the early 1990's. In June 1994, there were about 400 active ASes, and about 20,000 prefixes in a full table, the prefixes identifying groupings of nodes on the network. The largest AS had some 30 neighbors, and a Network Access Point (NAP) router might receive about a gigabyte of BGP messages per month. By contrast, in December 2002 there were over 17,000 active ASes, about 120,000 prefixes in a full table, and an AS could have over 3,000 neighbors. While vendors have improved router speeds and the quality of BGP implementations in response to the large increase in routing traffic, there have not been corresponding strides in building tools for addressing or managing routing complexity. Today, BGP message streams exchanged by border routers are bursty and voluminous, and can exceed several gigabytes per day in a single router in an Internet exchange, and routing patterns are constantly changing. BGP routing problems having global impacts on Internet traffic have become commonplace.

Such problems can have myriad root causes, including router misconfigurations, link layer failures, software bugs, and collateral damage from high-speed scanning and DoS attacks. BGP instability routinely translates into degraded quality of service, and can result in complete loss of connectivity. BGP route changes can propagate relatively slowly on the network, with convergence times ranging from tens of seconds to several minutes. Such route changes can create transient unreachabilities and packet drops, which can affect large numbers of traffic flows on today's high speed networks. A misconfiguration or an attack can last many hours before it is mitigated. Routing problems can have significant economic consequences. Correctness and stability of BGP operation can be vital for the seamless operation of extranets, virtual private networks (VPNs), portals, supplier-provider logistics chains, network-delivered services and other mission-critical IT systems. Though often touted as overcoming routing problems, virtual networks can be as vulnerable to BGP routing failures as other connections traversing multiple ASes beyond their administrative reach.

A BGP failure to route enterprise traffic to strategically important networks can be particularly frustrating if the root cause lies in a remote AS. The requirements of global communications thus imply a need for monitoring the health of global routing for rapid problem mitigation. However, a lack of proper tools can limit existing network monitoring systems to the scope of a single AS. Basic Simple Network Management Protocol (SNMP) based systems for monitoring of network devices and aggregate traffic are routinely deployed in networked organizations. They can provide important information about the flow of traffic within a monitored AS, but generally cannot provide information about traffic that has left the AS. In fact, traffic to external addresses on the average traverses three to four ASes before it reaches its destination. A global BGP monitoring system that can quickly alert an organization to routing problems affecting the organization's traffic, regardless of where the problem originates in the Internet, can be an important component of a comprehensive network management, security or surveillance system.

However, typical existing network monitoring solutions can be limited to an organization's own routers. Such solutions do not resolve problems that originate beyond the network's administrative boundary, especially if a problem originates further beyond the next-hop peer and/or provider networks. Essentially, a single router, and even a single AS, can be said to have a myopic view of the Internet—it can see the routes radiating from itself to networks in other ASes, but is blind to other routes traversing the Internet. However, correlating behavior based on the unseen routes can help to localize BGP problems.

Generating real time BGP routing alarms and resolving their root causes can require multi-router, multi-AS monitoring. Periodic analysis of routing tables can be insufficient in that such periodic analysis only offers snapshots frozen in time, missing the dynamics of the routing changes propagating through the network. Current practices of BGP monitoring, troubleshooting and security evaluation can typically be based on a combination of SNMP based monitoring of one's own routers, various means for processing Internet Protocol (IP) BGP output, examination of routes in remote looking glass routers, and seeking collaborative help from various operator's groups, such as the North American Network Operators' Group (NANOG), and other, similar mailing lists. Such approaches can be slow and labor intensive, and require highly skilled professionals.

SUMMARY

The disclosed methods and systems include network monitoring services that can monitor evolving routes to networks in real time as seen from multiple vantage points in the network. Interactive routing analyses, drill-down and forensics can be performed using an extensive repository of Border Gateway Protocol update traffic. The routing message data can be collected from a large number of routers on the network, and correlated across multiple routers and across time. Additionally, the data in the repository can correlate with routing registry data and/or Domain Name Service (DNS) data. In one embodiment, the data can be streamed to a user in real time (e.g., in XML or another format) and additionally and/or optionally, the user can interactively query the data. Alarms can be set to detect selected routing problems. In setting the alarms, the message data for routers can be processed in timestamp order. Current message data from routers can be compared with previous message data to determine a condition status. An alarm can be fired when the condition status meets temporal correlation criteria and/or spatial correlation criteria.

As used herein, the "firing" of an alarm, and other derivatives of the word "fire" in relation to an alarm, can be understood to be the setting, establishing, maintaining and/or providing of an alarm, which can be an audio, visual, and/or other indicator. Further, although the disclosed methods and systems refer to "firing" an alarm when a condition or other criteria "exceeds a threshold," it can be understood that such expression includes and thus also refers to a comparison of one value (e.g., data) to another value (e.g., alarm threshold), and based on the comparison, setting/firing an alarm, and/or not setting/firing an alarm. As provided herein, to "stand down" an alarm can be understood to unset, clear, not provide, not maintain, and/or otherwise eliminate an alarm that was previously provided, set, maintained, and/or established.

In one embodiment, the disclosed methods and systems include a computer program tangibly stored on a computer-readable medium and operable to cause a computer to enable monitoring network traffic, and can include instructions to collect routing message data from a plurality of routers on the network, correlate the routing message data across multiple routers and across time to obtain correlated data, and analyze the correlated data to obtain routing patterns. The routing message data can be Border Gateway Protocol message data. Collecting data can include collecting structural information regarding the network, including routing registry data and Domain Name Service data. The structural information can be correlated with the routing message data. The routing patterns can be streamed in real-time over the network. Collecting the data can include establishing sessions between collector routers and remote peer routers located in geographically diverse locations.

The computer program can include instructions to provide an alarm(s) (e.g., routing alarms) based on the routing patterns. To provide routing alarms, the computer program can include instructions to process the message data for network prefixes in timestamp order, compare current message data for prefixes with previous message data for the prefix to determine a condition status for alarm conditions of the prefix, and fire the routing alarm for the prefix when the condition status meets a temporal correlation criteria and/or a spatial correlation criteria. Graphical representations of the fired routing alarms can be presented to a user.

The computer program can determine that the condition status meets the temporal correlation criteria when the condition status indicates at least one of the alarm conditions is high for a predetermined time duration, and that the condition status meets the spatial correlation criteria when the condition status for a predetermined number of prefixes indicate a same alarm condition is high. The computer program can further determine that the condition status meets the spatial correlation criteria when the condition status for a predetermined number of prefixes having a specified geographical distribution indicate a same alarm condition is high.

The instructions to provide the routing alarms can further include instructions to assign a value to the routing alarms, apply a processing scheme to the values (e.g., to decrease the values over time), and remove an identified routing alarm based on a comparison of the value of the alarm to a predetermined valued (e.g., when the value of the identified routing alarm decreases below a predetermined value). A set of the alarms can be summarized to obtain a composite alarm. The instructions to summarize can include instructions to combine routing alarms based on network prefixes, Autonomous Systems on the network and/or sub-networks on the network. The instructions to combine routing alarms based on network prefixes can include instructions to generate a list of more-specific prefixes and/or a list of origin Autonomous System prefixes based on the routing message data for the network prefixes lists of more-specific prefixes, and to combine the routing alarms for the more-specific prefixes and for the origin Autonomous System prefixes chosen from the respective lists.

The instructions to analyze the correlated data can include instructions to process one or more time series of the correlated data by detecting features in the correlated data corresponding to a plurality of the multiple routers having similar patterns of message data over selected portions of the time series. The instructions to detect features can include instructions to determine when the correlated data for the multiple routers indicates the routing message data exceeds a threshold number of prefixes. The instructions can include instructions to identify sub-networks and/or Autonomous Systems on the network corresponding to the correlated data of the features, and can include instructions to vary the timescales of the selected portions of the time series. The instructions to process can include instructions to apply signal processing techniques including feature detection, correlation and clustering techniques, where such techniques can be applied over multiple time series, as provided herein.

Graphical representations of the routing message data and/or the correlated data can be presented to a user. The user can interactively query the data based on the graphical representations. The computer program can include instructions to process the queries and present data matching the queries to the user.

In one embodiment, a method of real-time delivery of network data can include collecting routing data from a plurality of routers on the network, correlating the routing data across multiple routers and across time to obtain the network data, and streaming the network data to users over the network. Correlating the routing data can include determining at least one of a number of network metrics, including a globally reachable network prefix metric, an intensity metric indicative of total routing message traffic on the network, an unreachable network metric, a route instability metric, route instability score distribution metrics.

Determining the globally reachable network prefix metric can include determining default-free routing table sizes over a predetermined timeframe, such that the metric reflects connectivity losses and degradation events and variations in a size of the network. Determining the intensity metric can include determining total route announcement message traffic and total withdrawal message traffic. Determining the unreachable network metric can include tracking a number of sub-networks estimated to be temporarily unreachable, optionally conditioned on prior reachability to correct for expected levels of sub-network arrivals and departures. Determining the route instability metric can include applying an instability score to routes to each prefix, cumulatively computing the instability score for each prefix over time, and suppressing the instability score following route stabilization. Determining the route instability score distribution metrics can include determining a set of vectorial metrics representing a breakdown of route instabilities according to severity and prefix size.

The method can include detecting features in the network data corresponding to multiple ones of the plurality of routers having similar patterns of network metrics over varying timescales. Detecting features can include determining when the network data for each of the multiple ones of the plurality of routers indicates a number of prefixes exceeds a threshold number of prefixes for at least one metric. The method can include identifying sub-networks and/or Autonomous Systems corresponding to prefixes associated with the network data of the features.

In one embodiment, a method of providing routing alarms for a network can include processing, for a plurality of peer routers distributed in the network, Border Gateway Protocol (BGP) UPDATE messages in timestamp order for network prefixes identified in the BGP UPDATE messages, setting at least one alarm condition for network prefixes based on a comparison of current messages received and previous messages received, correlating the alarm conditions over time and across multiple peer routers, and firing a routing alarm for a network prefix when at least one of the alarm conditions meets a temporal correlation criterion and/or a spatial correlation criterion. The alarm condition meets the temporal correlation criteria when the alarm condition is set for a predetermined time duration, and the alarm condition meets the spatial correlation criteria when the alarm condition is set for a predetermined number of peer routers, or is set for a predetermined number of peer routers having a specified geographical distribution.

Providing the routing alarms can include assigning a value to the routing alarms, applying a processing scheme to the values, and removing an identified routing alarm when the value of the identified routing alarm attains a predetermined value. The processing scheme can decrease the values based on time, although other processing schemes can be used (e.g., fixed over time, fixed and decreasing schemes, etc.). A set of routing alarms can be summarized to obtain a composite alarm by combining routing alarms based on network prefixes, Autonomous Systems on the network, and/or sub-networks on the network. The method can generate lists of more-specific prefixes and/or lists of origin Autonomous System prefixes based on the routing message data for the network prefixes, and can combine routing alarms for the more-specific prefixes and for the origin Autonomous System prefixes chosen from the respective lists.

The method can set a variety of alarm conditions based on varying criteria, including setting an ADVERTISED condition for a prefix to high when the prefix is advertised, setting a CHANGED condition for a prefix to high when the prefix is advertised with one or more different BGP attributes or when the prefix is withdrawn, setting a DEGRADED condition for a prefix to high when the prefix is advertised with a longer ASPATH or when the prefix is withdrawn, setting a WITHDRAWN condition for a prefix to high when the prefix is withdrawn, setting an UNREACHABLE condition for a prefix to high when the prefix is withdrawn and there is no route to a less specific prefix, setting a DEAGGREGATION condition to high for a prefix when an unauthorized, more specific prefix is advertised, and setting an ORIGIN condition for a prefix to high when the prefix was advertised by an unauthorized Autonomous System on the network, or when an Autonomous System on the network advertises an unauthorized prefix.

In one aspect, various embodiments feature a method for determining instability of a group of network prefixes. The method includes receiving routing message data from a plurality of routers, and designating, based on the routing message data, a plurality of prefixes as a group. Each prefix in the group has a common characteristic. The method also includes deriving, based on the routing message data, a prefix instability metric for each of a subset of prefixes in the group, and determining a group instability metric based on the derived prefix instability metrics. The designating step may include correlating the routing message data with routing registry data, domain name service (DNS) data, or both.

The characteristic that is common to the prefixes of the group may include one or more of (i) ownership of the prefixes by an organization, (ii) traffic associated with the prefixes crossing a specified Internet service provider, and (iii) association of the prefixes with computers located within a specified region. In some embodiments, the associated traffic includes traffic originated from the prefixes and/or traffic directed to the prefixes. The specified region may include a city, a metropolitan area, a district, a province, a state, a country, a subcontinent, and a continent.

In some embodiments, the routing message data includes border gateway protocol (BGP) updates. Deriving the prefix instability metric may include computing: (i) a rate of BGP updates associated with the prefix, and (ii) the prefix instability metric based on the computed rate.

In another aspect, various embodiments feature a method for determining instability of a network subset, and the network includes several prefixes. The method includes associating a feature vector with each prefix in the network, and receiving routing message data from several routers. Based on the routing message data, a prefix instability metric for each prefix in a set of prefixes in the network is computed. The method also includes selecting a first subset of prefixes, such that for each prefix in the first subset the computed prefix instability metric is substantially different than a specified value associated with the prefix. The feature vectors associated with each prefix in the first subset are correlated to obtain a second subset of prefixes, and network-subset instability is determined based on the computed prefix instability of the prefixes in the second subset.

In some embodiments, the feature vector includes one or more of: (i) a geolocation of the prefix, (ii) an organization associated with the prefix, (iii) a first set of autonomous systems of network service providers that originated a route to the prefix, and (iv) a second set of autonomous systems of network service providers that provide upstream Internet transit to the prefix. The geolocation may be selected from the group consisting of a postal code, a city, a state, and a country.

In some embodiments, the method further includes generating an event based on the determined network-subset instability, and the event indicates instability of prefixes having a common property. The common property may be one or more of (i) ownership of the prefixes by an organization, (ii) traffic associated with the prefixes crossing a specified Internet service provider, and (iii) association of the prefixes with computers located within a specified region. The specified value associated with the prefix may be based on historical prefix instability metrics of that prefix.

In some embodiments, network-subset instability is represented as a map and/or a database. The prefix instability metric may be a compliance metric and/or a route-diversity metric. The routing message data may include BGP updates, and deriving the prefix instability metric may include computing: (i) a rate of BGP updates associated with the prefix, and (ii) the prefix instability metric based on the computed rate.

BRIEF DESCRIPTION OF THE DRAWINGS

FIG. 11B depicts instability scores for selected organizations, according to one embodiment.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

The present disclosure is directed to network monitoring services that can monitor evolving routes to networks as seen from multiple vantage points in the network. In one embodiment, the methods and systems can be performed substantially in real-time. The routing message data can be collected from a large number of routers on the network and stored in a repository of Border Gateway Protocol (BGP) update traffic. The data in the repository can be correlated across multiple routers and across time. Additionally, the data in the repository can correlate with routing registry data and/or Domain Name Service (DNS) data. Interactive queries, routing analyses, drill-down and forensics can be performed on the collected data. In addition, data and analysis can be streamed to a user, for example, in real-time. Alarms can be provided and/or set to detect selected routing problems. In setting the alarms, the message data for routers can be processed in timestamp order. Current message data from routers can be compared with previous message data to determine a condition status. An alarm can be fired when the condition status meets temporal correlation criteria and/or spatial correlation criteria.

For convenience and explanatory purposes, the systems and methods can be described herein with reference to exemplary systems and methods for use with the global Internet. However, the systems and methods described herein are not to be limited to the embodiments disclosed herein, and can be applicable to other networks with other configurations, and can include other applications and/or means for collecting data for monitoring network activity, and that additions, modifications, and/or other changes to the input, processing, and/or output to accommodate such other networks, configuration, and/or data are contemplated by the systems and methods described herein and can be made by those skilled in the art.

Figure 1:
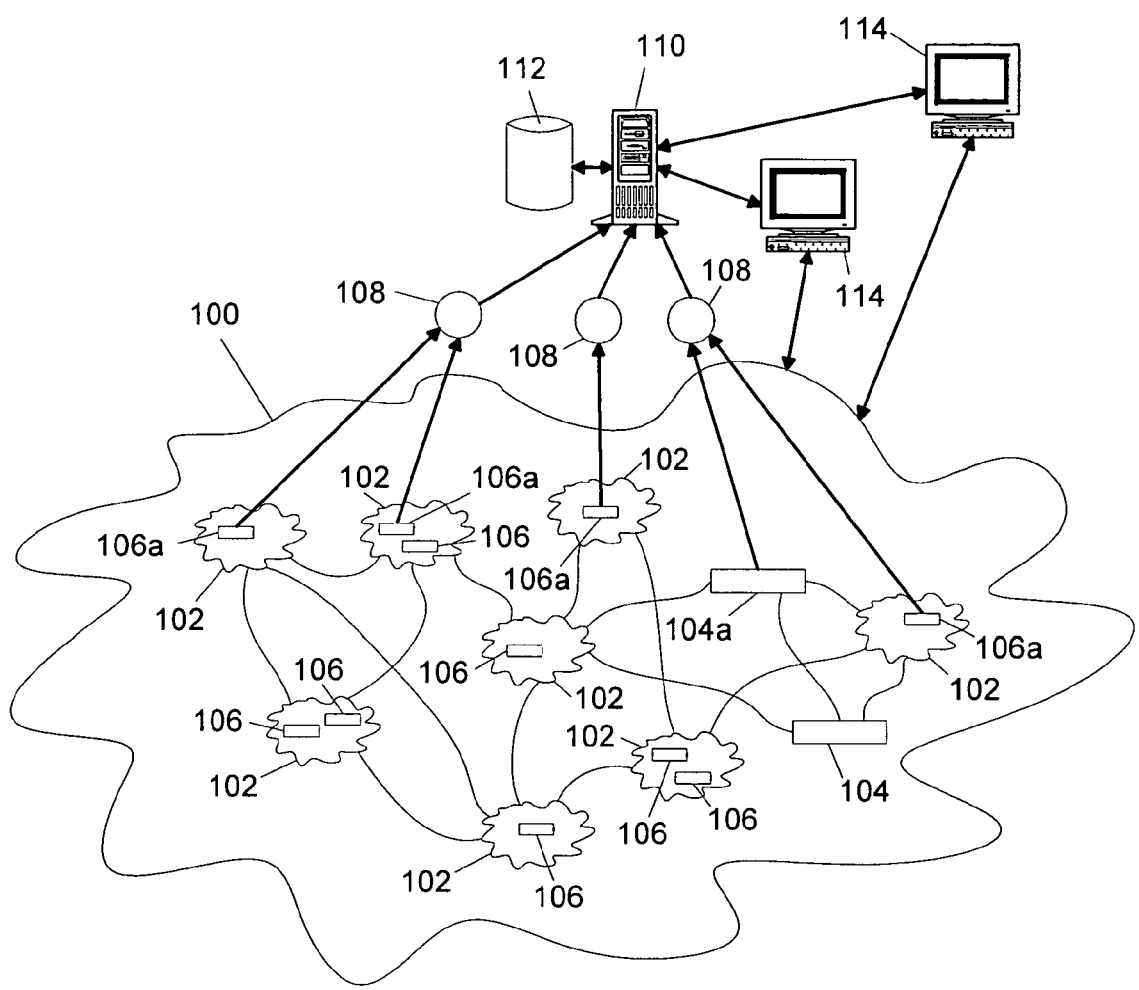
FIG. 1 illustrates a network environment that can accommodate the methods and systems described herein.

Referring to FIG. 1, a network 100 is illustrated, which can accommodate the methods and systems described herein. Network 100 can include a large number of Autonomous Systems (ASes) 102 and/or routers 104, a few of which are shown in FIG. 1. As described previously herein, the number of ASes on the global Internet is approaching 20,000. As used herein, an AS can be a connected group of one or more Internet Protocol (IP) networks having a single and clearly defined routing policy, that is controlled by a common network administrator (or group of administrators) on behalf of a single administrative entity (such as a university, a business enterprise, a business division, etc.), and can also be referred to herein as a routing domain. Nodes on a given network share the same network prefix but have a unique host number. An AS can include one or more AS border routers 106 and can share routing information with other ASes using the Border Gateway Protocol (BGP).

A number of the AS routers 106 and/or routers 104, designated as 106a and 104a, respectively, can maintain peering sessions with collection routers 108. Generally, the peering sessions can be silent, though sessions can include sending data back to AS routers 106a and routers 104a. Routers 104a and AS routers 106a can be strategically located throughout network 100 to provide a perspective of routing messages on network 100. Collection routers 108 can collect routing message data from the AS routers 106a and routers 104a for processing. Collection routers 108 do not announce routes to other routers such that the routing message data collected can reflect routing message data for active network components. For clarity, collection routers 108 in FIG. 1 are illustrated separate from network 100. In practice, some or all of collection routers 108 can be distributed within network 100.

Collection routers 108 can forward the collected message data to one or more analysis servers 110 that can store or archive the data, as shown in the FIG. 1 embodiment by a BGP database 112. For clarity and ease of expression, analysis server 110 and database 112 can be illustrated and referred to herein in the singular, though the use of multiple synchronized analysis servers 110 and databases 112 is contemplated. Analysis server(s) 110 can process the message data from database(s) 112 and provide clients 114 with tools for accessing, manipulating, and/or otherwise displaying the processed data to provide network monitoring services to one or more clients 114. Clients 114 can monitor evolving routes to their networks as seen from multiple vantage points (collection routers 108) on network 100. When multiple analysis servers 110 are used, the analysis servers 110 can be synchronized for processing data that can be distributed over multiple databases 112. Accordingly, the multiple databases 112 can further be synchronized and thus can communicate using wired and/or wireless communications protocols and/or techniques.

Database 112 can include BGP UPDATE message data, routing registry data, DNS data, and/or other network data as can be obtained and/or contemplated by those of skill in the art. BGP-speaking routers, such as routers 104 and AS routers 106, can send BGP UPDATE message data to their neighbor routers to announce their best routes to certain networks, or to withdraw routes that became unavailable. The neighboring BGP-speaking routers can propagate the UPDATES to their neighbors, and so on. The UPDATES are time stamped and can carry BGP attributes (referred to herein as "attribute(s)") that can describe characteristics of prefixes, e.g., an ASPATH attribute lists a sequence of traversed ASes back to the AS originating the prefix. Other attributes can include, but not be limited to, Next Hop, iBGP Next Hop, Third Party Next Hop, Origin, Aggregator, Local Preference, Multi-Exit Discriminator (MED), MED and Interior Gateway Protocol (IGP) Metric, Weight, Community, Weil-Known Communities, and No-Export Community. An event impacting global routing can begin with one or more routers originating a certain number of UPDATE messages at approximately the same time, after detecting a root cause routing event, such as a session open, a router shutdown or loss of session, a session reset, and/or a change of Interior Gateway Protocol (IGP) reachability or connectivity for an AS 106.

The UPDATES can be seen to propagate across the BGP-speaking routers as a kind of wave front traveling across the network 100 topology. Those of skill in the art can recognize that correlation analysis of the UPDATES received at routers 104a and AS routers 106a can detect and localize routing problems, in the manner that earthquakes can be detected and localized by correlating data from a grid of geographically dispersed sensors. Typically, UPDATES can be originated by multiple routers and reflect multiple root causes, and propagation can be likened to a superposition of wave fronts. The FIG. 1 analysis server 110 can track and correlate the UPDATEs for individual prefixes and/or aggregate prefixes arriving at distinct collection routers 108 to help isolate and diagnose the distinct routing events causing the origination of the UPDATEs. Processing techniques can include feature detection schemes (e.g., Bayesian classifiers, neural networks, etc.), clustering, and/or other signal processing techniques for correlating multiple time series data from multiple sensors.

Applying the above described correlations to the time stamped UPDATE data from database 112, analysis server 110 can provide a number of network monitoring services to clients 114, including routing analysis for a given time window/period/interval, streaming monitoring data (e.g., real-time) to clients 114, and alarms (e.g., real-time) to provide clients 114 with the capability to detect and diagnose BGP routing problems originating outside of their networks.

Figure 2:
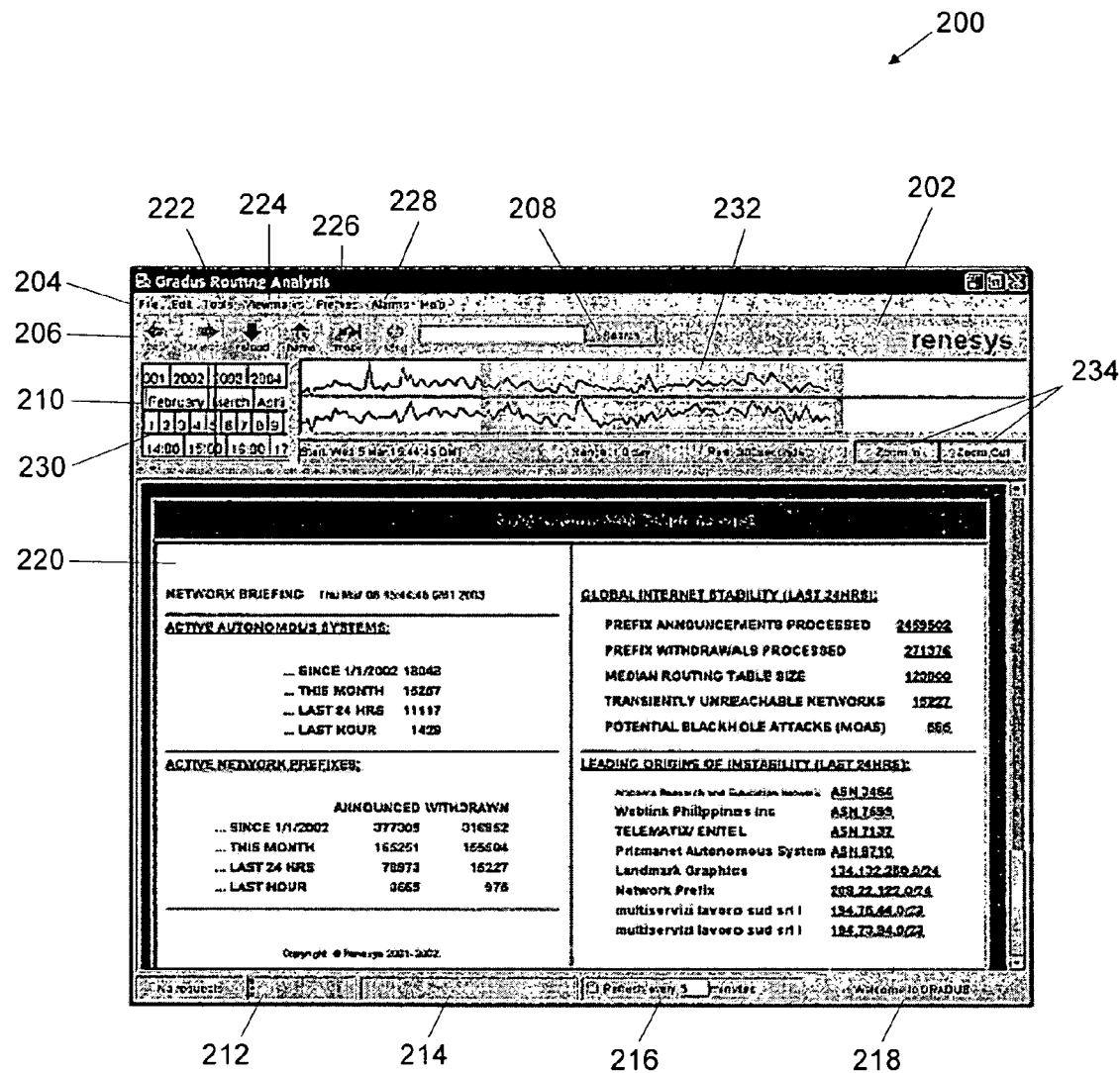
FIG. 2 illustrates an exemplary user interface for monitoring and analysis of network routing data.

FIG. 2 illustrates an exemplary user interface 200 that an analysis server 110 can present to user 114 for monitoring and analysis of network 100 routing. Interface 200 is shown for illustrative purposes and other arrangements of the data and controls for manipulating and viewing the data are contemplated. Interface 200 can be configured to include a persistent window control framework 202 that can include menu bar 204, navigation buttons 206 and a search field 208. In addition, window control framework 202 can include calendar navigation tool 210, progress indicator 212, prefix indicator 214, refresh selector 216 and tool indicator 218, and/or other navigation tools, selection tools, indicators and the like. In addition to window control framework 202, interface 200 can include a window 220 for displaying the requested data.

Menu bar 204 can have a number of pull down menus. FIG. 2 illustrates Files, Edit, Tools, Viewmarks, Prefixes, Alarms and Help menus, though fewer or more menus and/or different arrangements of menus can be contemplated. In particular, Tools menu 222 can include a list of available data display, analysis and alarm tools. When a tool is selected from Tools menu 222, the contents of window 220 change to reflect the use of the selected tool.

The Viewmarks menu 224 can allow for creation and retrieval of viewmarks for saving references to the data view in the window 220 at the time the viewmark was created. The viewmarks can include extensible Markup Language (XML) records corresponding to the data view in the window 220. The viewmarks can be used for future retrieval of the data view and/or for sharing the data view, e.g., by emailing a viewmark to another client 114. As an example, a series of viewmarks can be created during data analysis such that a time progression of the analysis can be presented by sequentially retrieving the viewmarks. Viewmarks menu 224 can include menu items for creating or adding viewmarks, presenting a listing of existing viewmarks, selecting a viewmark for display, either by replacing the current data view, or overlaying the current data view with a new frame, copying viewmarks, editing viewmarks, and/or deleting viewmarks.

The Prefixes menu 226 can provide for creating, selecting, editing and/or deleting lists of network prefixes that can be later selected for direct link to prefix-specific analysis tools. The Alarms menu 228 can provide for creating and editing alarms, as described herein in more detail for the provision of real-time alarms by analysis server 110.

Navigation buttons 206 can provide for undoing and redoing selection and setting changes, reloading data from analysis server 110, tracking the latest available data, and/or stopping requests for data. Search tool 208 can provide for searching or querying database 112 to obtain data. Queries can include, but not be limited to queries by AS numbers, prefix names, domain names and/or other network attributes. Upon searching, window 220 can display connectivity information related to the selected ASes, prefixes and/or domain names. Thus, search tool 208 can provide an entry point to multiple tools for data display. FIG. 2 illustrates a welcome interface in window 220 that can provide client 114 with routing information of a more general nature for network 100, including numbers of active ASes and prefixes, overall network stability metrics, such as numbers of BGP announcements/withdrawals, table sizes, unreachable networks, blackhole attacks, and listings of leading origins of instability.

Calendar navigation tool 210 can provide for choosing a timeframe or time window (e.g., time interval, time period, etc.) of data for analysis. For the exemplary interface 200, calendar navigation tool 210 can include a calendar 230 for selection of a date and time for the start of the data window, a time-range slider 232 superimposed on graphical representations of aggregate BGP prefix announcement/withdrawal rates, and slider controls 234 for adjusting an expanse of time-range slider 232. Selection of the start of the data window through calendar 230 sets the left edge of time-range slider 232. The start can be adjusted by moving the left edge of time-range slider 232, e.g., by clicking-on/selecting and "dragging" (e.g., manipulating, moving, etc.) the left edge with a mouse. The range of the window can be adjusted by moving the right edge of time-range slider 232. Time-range slider 232 can be moved left or right, as by dragging with a mouse, to change the start time without changing the range. Other graphical representations and/or provisions for choosing a timeframe in addition to, or in lieu of, calendar navigation tool 210 of interface 200 can be contemplated by those of skill in the art.

Progress indicator 212 can provide for displaying status information regarding data request by a client 114. For example, status information can include a count of pending requests, an indication of how much data from a pending request has been downloaded, and an indication of memory usage. Prefix indicator 214 can indicate which prefix analysis server 110 is processing. Refresh selector 216 provides for a client 114 to select a refresh rate whereby window 220 can update the display to track the latest data at the selected rate. Tool indicator 218 can provide an indication of the tool selected from Tools menu 222.

Figure 3:
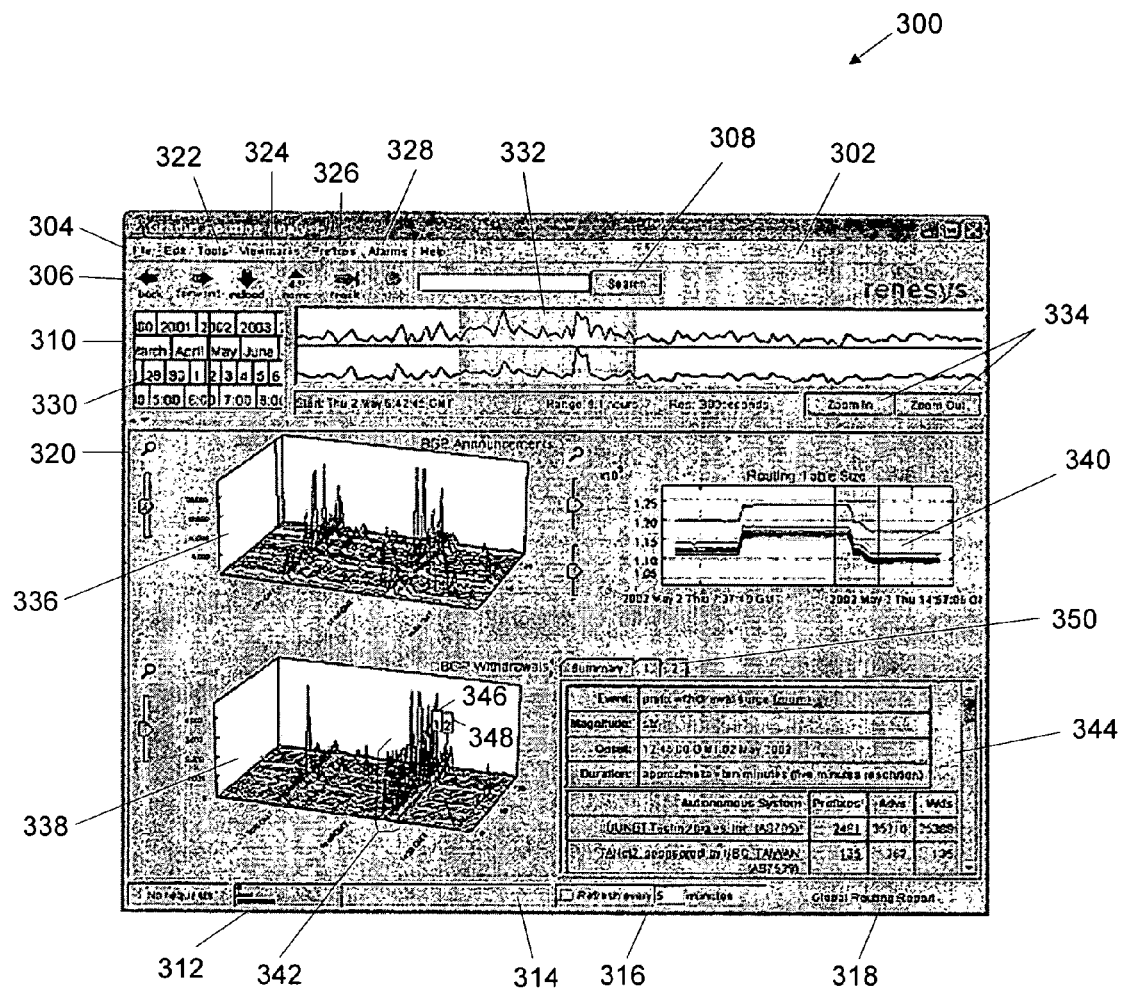
FIG. 3 illustrates an exemplary user interface for a global routing report.

FIG. 3 illustrates an exemplary user interface 300 for displaying a global routing report to client 114 in window 320, as chosen from Tools menu 322, and indicated by tool indicator 318. Generally, interface 300 can correspond with interface 200 of FIG. 2, having persistent window control framework 302 similar to window control framework 202 of FIG. 2, such that reference numbers offset by 100 can refer to like features. Interface 300 is shown for illustrative purposes and other arrangements of the data and controls for manipulating and viewing the data are contemplated. The global routing report tool can provide a view on routing activity in network 100 for the selected time range. The report shown in window 320 can include three separate tools: BGP Announcements 336; BGP Withdrawals 338; and Routing Table Size 340.

BGP Announcements 336 and BGP Withdrawals 338 can provide globally correlated, three-dimensional plots of the BGP prefix announcement rates and withdrawal rates, respectively, recorded in the time frame selected by the calendar navigation tool 310. The x-axes indicate time and the z-axes indicate the number of prefix announcements and withdrawals, respectively. The distinct parallel plot lines indexed on the y-axes correspond to the displayed set of routers 104a and ASes routers 106a, associated with collecting routers 108 and referred to herein also as peers 104a, 106a.

The plots 336, 338 can provide for observing the temporal correlations among the rates of prefix announcements and withdrawals, respectively, as received from distinct peers 104a, 106a. Wave-like or fence-like features parallel to the y-axes can indicate routing events recorded by most of the displayed peers 104a, 106a causing surges in prefix announcements or withdrawals propagated globally across network 100. Single peaks and/or other features specific to a single peer 104a, 106a can indicate a single AS 102 or router 104 reporting a routing instability. Plots 336, 338 can include controls for modifying the plot axes and for zooming in on features in the plots. For example, client 114 can zoom in on wave-like feature 342 by selecting a range along the x-axis. Use of the controls can result in re-plotting the plots according to the selected ranges.

Routing Table Size 340 can provide a two-dimensional plot of the sizes of BGP forwarding tables for a number of collection routers 108. The x-axis indicates time and corresponds with the range shown in plot BGP Announcements 346 and BGP Withdrawals 338. The y-axis indicates the number of distinct routable prefixes, with each prefix listed once. Each line of plot 340 corresponds to a single BGP routing table. Plot 340 can indicate routing events with global network impact when a number of the lines increase or decrease, for example, within a given time interval, which can be correlated with features in BGP Announcements 346 and BGP Withdrawals 338. Routing Table Size 340 can include controls for modifying the plot axes.

In addition to the plots 336-340, window 320 can include analysis box 344, which can provide detailed information regarding significant routing events detected in the selected data displayed in plots 336-340. In providing analysis box 344, an analysis server 110 can process the selected data for correlations, such as wave-like feature 342, which can identify routing events. Such events can be tagged, as indicated by tags 346, 348 in plot 338. For each tag, analysis box 344 can include an associated tab 350. By selecting a tab, analysis server 110 can perform an analysis of the associated event to determine a probable cause of the detected event. The results of the analysis can be presented in analysis box 344 in terms of ASes which announced or withdrew the prefixes, and a listing of the prefixes. The ASes and prefixes presented in analysis box 344 can be linked to other tools from Tools menu 222, e.g., an AS neighbor graph tool and a prefix tool, as described in more detail herein.

As noted, Tools menu 222 can include prefix tools by which analysis server 110 can process the BGP UPDATE data from database 112 for a selected prefix or group of prefixes over a selected period of time. The data can be processed and presented to client 114 in various formats, including overviews of routing activity for the selected prefix(es) in the form of routing summaries, tables of raw traffic, route changes, route outages and route status, and provider maps.

Figure 4:
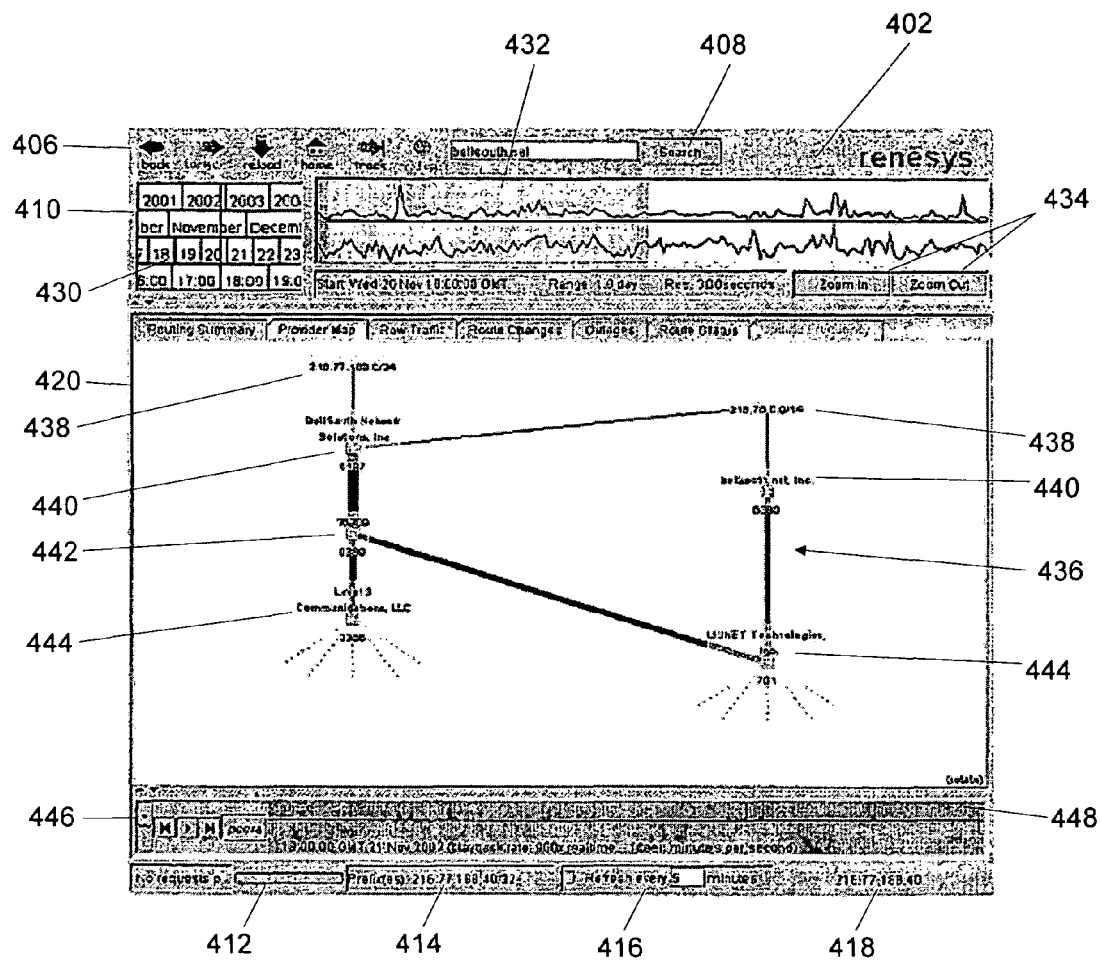
FIG. 4 illustrates an exemplary user interface for a provider map.

FIG. 4 illustrates a portion of an exemplary interface 400 for displaying a provider map 436 to client 114 in window 420, as chosen from Tools menu 422 (not shown), with tool indicator 418 showing the selected prefix. Generally, interface 400 can correspond with interface 200 of FIG. 2, having persistent window control framework 402 similar to window control framework 202 of FIG. 2, such that reference numbers offset by 200 from those of FIG. 2 can refer to like features. Interface 400 is shown for illustrative purposes and other arrangements of the data and controls for manipulating and viewing the data are contemplated.

Provider map 436 can display origin ASes and the near portion of the routes to the selected prefix that were observed over the selected period of time from peers 104a, 106a. Thus, provider map 436 can show a subgraph of routes to the selected prefix from the network and can show how the routes have been changing in time. Provider map 436 can identify one or more prefixes 438 covering the selected prefix. Prefixes 438 can include the single selected prefix, and/or can include a row of one or more aggregated (less-specific) prefixes that contain the selected prefix, as shown in exemplary provider map 436 of FIG. 4. Where applicable, analysis server 110 can detect and display multiple origin prefixes.

Connections between prefixes and ASes 440, between ASes 440 and one or more network providers 442, and/or between ASes 440 and network core AS 444 can be color coded, shaded, or otherwise distinctly displayed to distinguish the various connections and whether the connections represent an announced path or a withdrawn path. The thickness of the connections can qualitatively indicate the fraction of peers 104a, 106a announcing or withdrawing the prefix and whose ASPATH includes the given segment.

In addition, FIG. 4 illustrates a playback control mechanism 446 to examine the time progression of prefix specific data. By choosing forward, reverse, stop, pause, play or other such features of playback control mechanism 446, similar to well-known controls for a video cassette recorder, client 114 can change the time period displayed in a continuous or incremental fashion. Though shown in connection with provider map 436, playback control mechanism 446 can be applicable to the various prefix tools described above. Playback control mechanism 446 can also include a time range display 448 with color coded, shaded, or otherwise distinctly displayed block indicators sized to qualitatively represent the number of announcements or withdrawals. Time range display 448 can be expanded to display multiple peers 104a, 106a, which can be useful in identification and/or tracking of flap damping by upstream ASes and other routing events.

Figure 5:
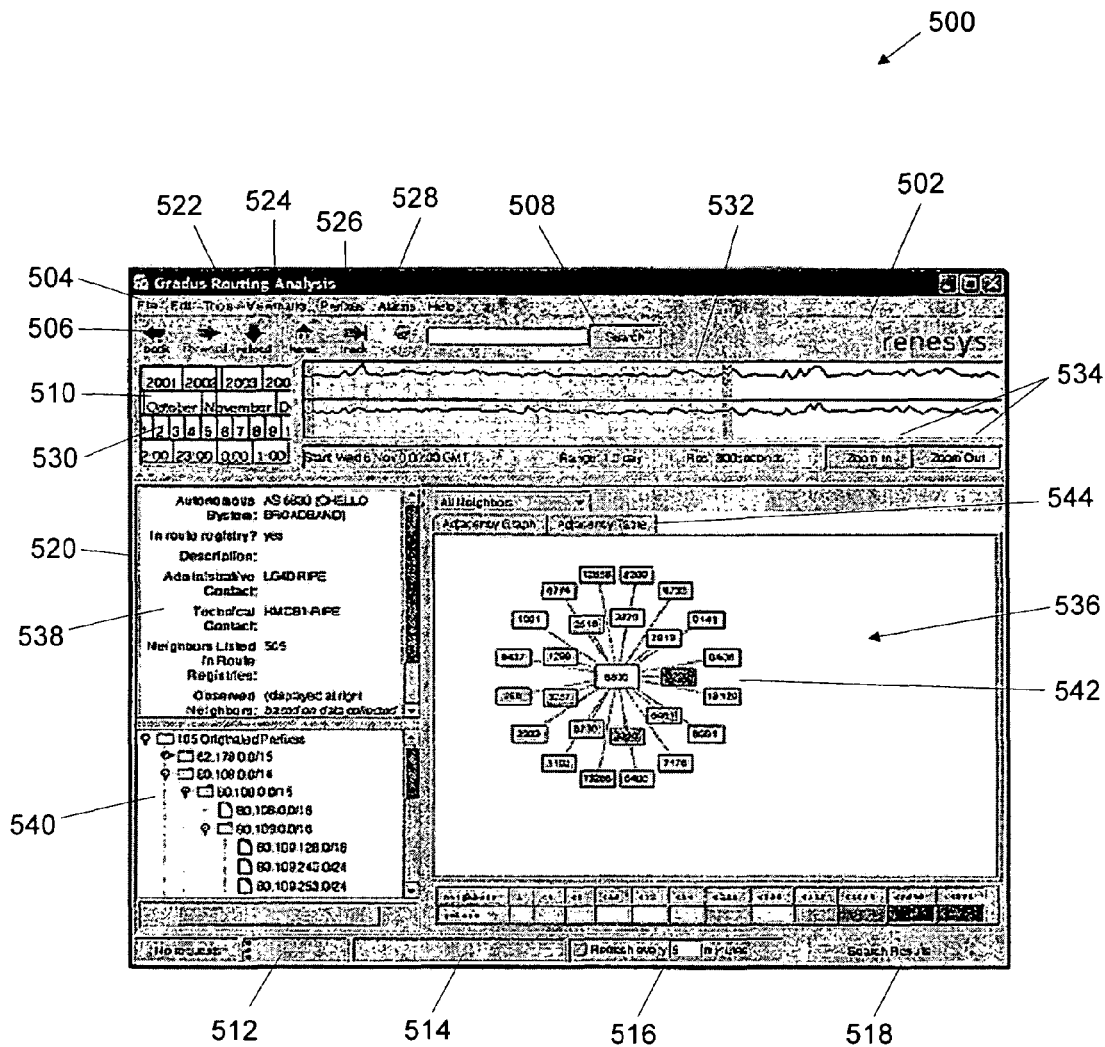
FIG. 5 illustrates an exemplary user interface for an AS neighbor graph.

FIG. 5 illustrates an exemplary interface 500 for displaying an AS neighbor graph 536 to client 114 in window 520, as chosen from Tools menu 522, or as selected in search window 508. For the exemplary user interface 500, tool indicator 518 notes that the AS neighbor graph 536 is the result of an AS search. Generally, interface 500 can correspond with interface 200 of FIG. 2, having persistent window control framework 502 similar to window control framework 202 of FIG. 2, such that reference numbers offset by 300 from those of FIG. 2 can refer to like features. Interface 500 is shown for illustrative purposes and other arrangements of the data and controls for manipulating and viewing the data are contemplated.

AS neighbor graph 536 can include route registry information 538 for the given AS, a listing 540 of network prefixes originated by the given AS and an adjacency graph 542. Listing 540 can be organized as a Classless Inter-Domain Routing (CIDR) tree so as to provide a view on the aggregation policy employed by the origin AS. The tree can be expanded or contracted by clicking-on/selecting icons near the prefixes, as is common for such tree structures. Optionally, selecting one or more prefixes from listing 540 can result in displaying a listing of prefix tools available for selection by client 114.

Adjacency graph 542 displays the specified AS (AS number 6830 for the exemplary interface 500) in the middle of a star graph of neighbor ASes. The ASes can be color, or otherwise coded according to the number of AS-neighbors they have. Adjacency graph 542 can include upstream neighbors, downstream neighbors, or both, as selected by client 114. Upstream neighbors can include those that appear closer to collection routers 108 in the ASPATH attributes of the BGP messages than the specified AS, while downstream neighbors are those that appear farther. Accordingly, upstream neighbors tend to be provider networks, while downstream neighbors tend to be customer networks, though other relationships between upstream/downstream neighbors can be contemplated. Optionally, selecting an AS from adjacency graph 542 can result in displaying AS neighbor graph 536 for the selected AS. Optionally, client 114 can choose, as indicated by tab 544, to view the neighbor information in tabular format, where rows can indicate the most recent appearance of each neighborhood relation in BGP messages.

The methods and systems described herein optionally can stream routing data as described above and/or as otherwise obtained from additional analyses of data in database 112, to client 114. Generally, streaming can include providing reports (e.g., real-time) on the state and stability of global network BGP routing, delivered in XML format. Data can be periodically updated, with the time period for updating selected by client 114 and with sampling rates chosen to suit the data for display. Data streams can include the number of globally reachable network prefixes, intensity of route announcement and withdrawal message traffic, the number of unreachable networks, a route instability score, a distribution of route instability scores, geographic distribution of the number of unreachable networks, a listing of networks with the highest number of route changes across the set of peers 104a, 106a, a listing of ASes with the largest numbers or originated unstable networks, and other data as client 114 can request from database 112.

The number of globally reachable network prefixes can be based on default-free routing table sizes over the selected time period. The intensity can be indicative of the total routing message traffic over the selected time period. The number of unreachable networks can track the number of networks that are estimated to be temporarily unreachable, conditioned on their prior reachability to correct for normal levels of network arrival and departure process due to economic and engineering activities. The route instability score can track the population of unstable routes by applying an instability score to the routes to each network prefix. The per-prefix instability scores can be computed cumulatively over time and suppressed following route stabilization.

The distribution of the instability scores can include a set of vectorial metrics representing the breakdown of route instabilities according to their severity and network prefix size. The geographical distribution can permit geographic localization of the impact of connectivity failures. The listings of unstable networks and unstable ASes can also assist in monitoring and resolution of connectivity failures.

Both the data representation described previously and the streaming data representation can include monitoring for and/or providing routing alarms for alerting client 114 to potential and/or actual routing events. Alarms can provide a capability for network problem detection and diagnosis that can lower the cost of day-to-day network operations. Routing alarms can be organized hierarchically. The alarms at the bottom of the hierarchy can be referred to as atomic alarms, which fire when the routes to a given network prefix are observed to change in defined ways, as will be described herein. For example, one can configure atomic alarms that fire when the prefix becomes unreachable from at least a certain threshold number of peers 104a, 106a, or when a route to the prefix with an unauthorized origin AS is announced by a peer 104a, 106a. In addition, the systems and methods described herein can be configured to generate SNMP traps for collection and correlation by a remote network management system in response to atomic alarms.

A hierarchy of alarms above the atomic alarms can be referred to as composite alarms, or alarm groups, which summarize the status of a set of alarms. Composite alarms can include prefix alarms, which can combine two subsets of alarms: (1) a set of atomic alarms for the prefix (P) itself; and (2), recursively, the set of prefix alarms for the client-approved more-specific network prefixes contained within P. The latter set can be empty if there are no approved more-specifics for P. At the time of prefix alarm configuration, the methods and systems described herein can initialize the list of more-specifics and the list of origin ASes on the basis of the analysis of the BGP UPDATEs received from peers 104a, 106a over a preceding time period, e.g., four weeks. The generated lists can be edited by client 114.

Composite alarms can further include AS alarms, whose components can include prefix alarms for prefixes originated by a given AS. When an AS alarm for a given AS is being configured, the methods and systems described herein can initialize the list of prefixes originated by the AS on the basis of the analysis of BGP UPDATEs received from peers 104a, 106a over the preceding time period. The list can be edited by client 114 by adding and deleting prefixes. Other composite alarms can be custom configured by grouping existing prefix alarms and/or composite alarms, which can reflect organizational ownership of networks, their physical location, and/or their strategic importance.

The alarms can be operated in various modes, including a real-time mode and an historical mode. In real-time mode, alarms can be computed in response to BGP UPDATE messages as soon as the messages arrive from peers 104a, 106a. In historical mode, alarms can be computed from the archived BGP UPDATE in database 112, beginning at a start time selected using the time navigation tools described previously. The historical mode can provide for "time travel", allowing a user to view how past routing events could have been detected by the configured alarms to fine-tune alarm configuration parameters. Further, the historical mode can be helpful in forensic analysis, where alarms can be configured to fire on specified events.

As noted, atomic alarms can be characterized by a single primary prefix P, and a trigger condition. For certain trigger conditions, an atomic alarm can additionally be characterized by a list of approved more specific prefixes, or a list of approved origin ASes for the prefix P. BGP messages for peers 104a, 106a can be analyzed by analysis server 110 to determine an alarm state, or condition for peers. Various alarms types can trigger atomic alarms based on the BGP UPDATEs received. Alarm types can include those shown in Table 1, though those of skill in the art can contemplate additional types of alarms. For each alarm type, there can be a corresponding peer alarm condition type.

TABLE 1

| Alarm name | Alarm description |
| --- | --- |
| ADVERTISED | Prefix P was advertised. |
| CHANGED | Prefix P was advertised with one or more different attributes, or withdrawn. |
| DEGRADED | Prefix P was advertised with a longer ASPATH, or withdrawn. |
| WITHDRAWN | Prefix P was withdrawn. |
| UNREACHABLE | Prefix P was withdrawn, and there is no route to any less specific prefix for P from the same peer. |
| DEAGGREGATION | An unauthorized more-specific prefix P' was advertised; that is, a prefix that is more specific than P but not on the approved list of more-specifics. |
| ORIGIN | Prefix P was advertised as originated by an unauthorized AS, or an AS advertised an unauthorized prefix P. |

Figure 6:
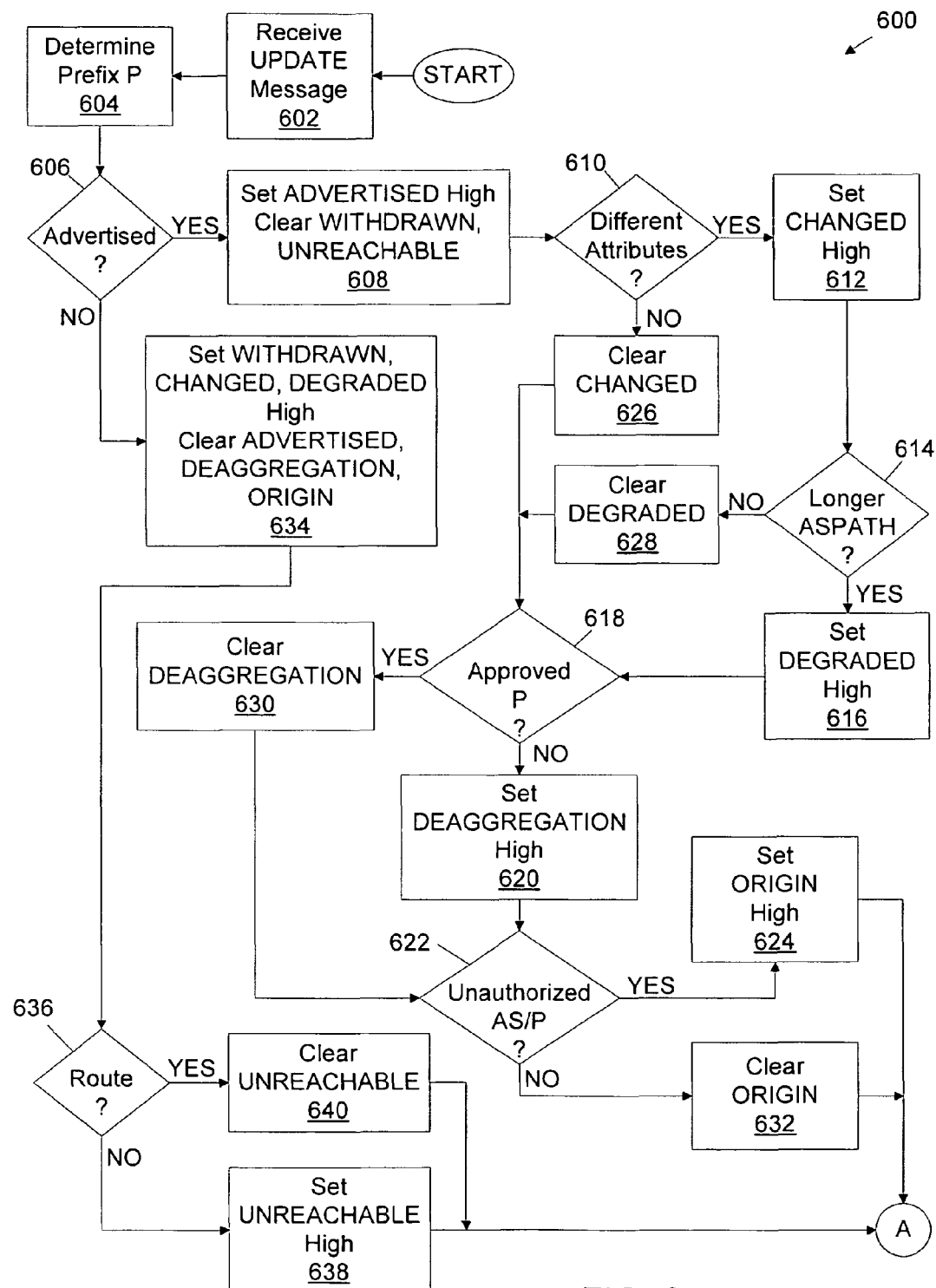
FIG. 6 illustrates a flow chart for a method of setting condition states.

FIG. 6 illustrates a method 600 by which analysis server 110 can set condition states for a prefix P based on BGP UPDATE messages received. Analysis server 110 of FIG. 1 can receive 602 an UPDATE message and can determine 604 the prefix P, or a more or less specific prefix, contained in the Network Layer Reachability Information (NLRI) field of the UPDATE message. Analysis server 100 can set or clear condition states for the conditions shown in Table 1 for the determined prefix. FIG. 6 provides an exemplary method for setting and/or clearing the condition states, though actions shown therein can be otherwise combined, separated, interchanged, and/or rearranged with more or fewer actions by those of skill in the art without departing from the disclosed method.

The exemplary method 600 of FIG. 6 can determine if the prefix P is ADVERTISED 606. If it is, the ADVERTISED state is set to high and the WITHDRAWN and UNREACHABLE states are cleared 608, as applicable. If the prefix P was advertised with one or more different attributes, as determined at 610, then the CHANGED state is set to high 612. If the prefix P was advertised with a longer ASPATH, as determined at 614, then the DEGRADED state is set to high 616. If a prefix that is more specific than P but not on the approved list of more-specifics was advertised, as determined at 618, then the DEAGGREGATION state is set to high 620. If prefix P was advertised as originated by an unauthorized AS, or an AS advertised an unauthorized prefix, as determined at 622, then the ORIGIN state is set to high 624. If the conditions determined at 610, 614, 618, or 622 are not met, then the CHANGED state, the DEGRADED state, the DEAGGREGATION state, or the ORIGIN state are cleared, as applicable at 626, 628, 630, or 632, respectively, and method 600 can proceed to correlation of the condition states, as indicated at "A".

If the prefix P is WITHDRAWN, as determined at 606, then the WITHDRAWN, CHANGED, and DEGRADED states can be set to high, and the ADVERTISED, DEAGGREGATION, and ORIGIN states can be cleared, as applicable at 634. If there is no route to any less specific prefix P from the same peer, as determined at 636, then the UNREACHABLE state can be set to high 638. If there is a route, then the UNREACHABLE state can be cleared 640, as applicable, and method 600 can proceed to correlation of the condition states, as indicated at "A". The following examples can illustrate the setting of condition states.

In a first example, a BGP UPDATE is received 602 from peer 0 and is determined 604 to be for prefix 192.168.0.0/16. The message is determined 606 to contain a withdrawal, and the WITHDRAWN, CHANGED and DEGRADED condition states are set to high, while the ADVERTISED, DEAGGREGATION and ORIGIN condition states are cleared at 634, as applicable. For this example, peer 0 previously had a valid route to 192.168.0.0/16, but there is no route to a less-specific prefix for P from the same peer, and the UNREACHABLE condition state is set to high. If a subsequent BGP UPDATE is received from the same peer with an advertisement of a route to 192.168.0.0/16, then the WITHDRAWN and UNREACHABLE condition states can be cleared, as at 608.

In a second example, a BGP UPDATE from peer 0 contains a withdrawal for prefix 192.168.12.0/24. As previously, the WITHDRAWN, CHANGED and DEGRADED condition states are set to high, while the ADVERTISED, DEAGGREGATION and ORIGIN condition states are cleared at 634, as applicable. For this example, peer 0 previously had valid routes to both 192.168.0.0/16 and 192.168.0.0/24. Because the route to 192.168.0.0/16 still exists, the more-specific is not entirely unreachable, and the UNREACHABLE condition state is cleared at 640, as applicable.

Figure 7:
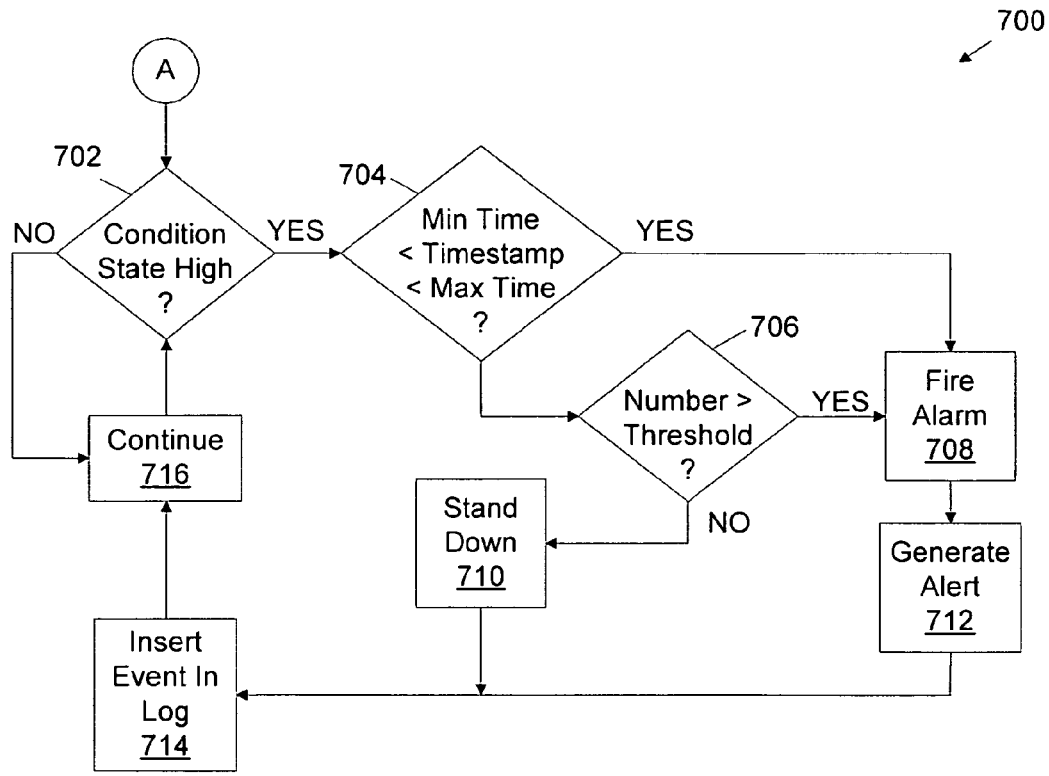
FIG. 7 illustrates a flow chart for a method of triggering alarms based on the condition states.

FIG. 7 illustrates a method 700 that can trigger atomic alarms based on the condition states determined in method 600. Method 700 can start at "A" and determine 702 if one or more of the alarm condition states from method 600 are set to high. An alarm condition state that is set to high can also be referred to herein as ah alarm condition that has fired, or conversely, when an alarm condition fires, the alarm condition state is set to high. For each alarm condition that has fired, method 700 can examine the cumulative history of firings to determine whether temporal and/or spatial correlation criteria have been met.

The peer alarm condition states can be time stamped when fired (when the alarm condition state is set to high). Further, a client configurable "minimum" and "maximum" hold time can be associated with one or more alarm conditions. If the time since firing the alarm condition is at least equal to the minimum hold time, but not longer than the maximum hold time, the temporal correlation criteria is met, as determined at 704. Generally, the minimum hold time can default to zero, such that an alarm condition is reported upon firing. Also, the maximum hold time can default to infinity, such that there is no maximum hold time.

Each peer alarm condition can also include a client configurable peer diversity threshold, which can indicate a minimum number of peer condition alarms for triggering an atomic alarm. If the number of peer condition alarms fired for a given alarm condition exceeds the diversity threshold, as determined at 706, the spatial correlation criteria is met. Requiring a threshold number of peer alarm conditions to be met can reduce "noise" signals that may be due to one or a small number of peers and that may not reflect the behavior of routes seen by the majority of routers. The diversity threshold can be configured to encompass geographically separated routers and/or a threshold number of routers. For example, the diversity threshold can be configured to require that the threshold number of peer conditions are spread over a geographic region, rather than being concentrated at a single geographic location.

If either the temporal and spatial correlation criteria is met for a given alarm condition, the associated atomic alarm can fire 708, or can be maintained in a firing state if the associated atomic alarm is already in a firing state. If both the temporal and spatial conditions are not met for a given alarm condition, the associated atomic alarm can be maintained in non-fired mode 710, or can be made to "stand down" if the associated alarm is already in a firing state. When an atomic alarm fires, an alert can be generated 712 and a log can be kept 714. Similarly, a log entry can indicate when an alarm stands down. Method 700 can continue 716 to check for high condition states received from method 600.

Figure 8:
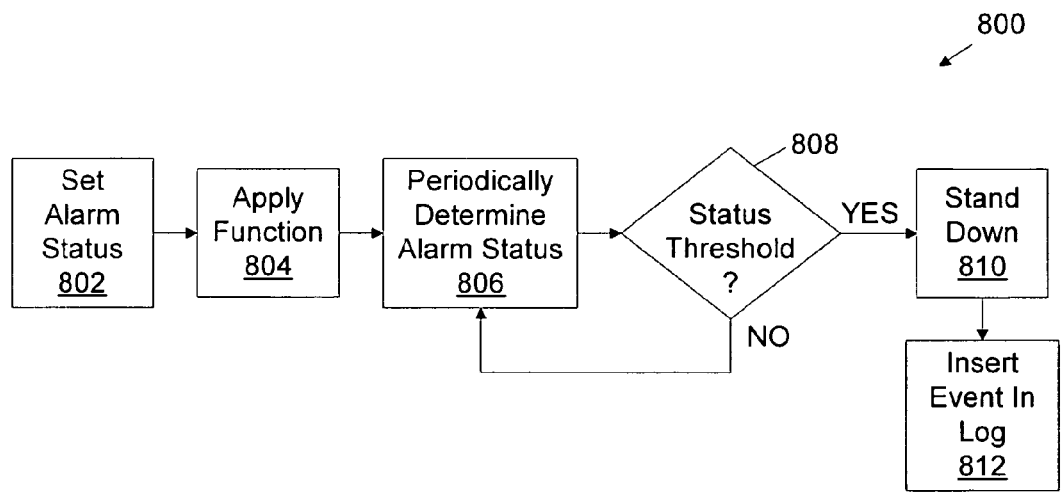
FIG. 8 illustrates a flow chart for a method of varying alarm statuses over time.

FIG. 8 illustrates optional further criteria that can be tracked for atomic alarms that have fired. In addition to the temporal and spatial correlation criteria of method 700, the atomic alarms can be characterized by an alarm status. When an atomic alarm fires, method 800 of FIG. 8 can set the status of the alarm at a certain initial value, as indicated at 802. A processing scheme can be applied to the alarm status, which can vary the alarm status over time 804. The function-based alarm status can be determined periodically (e.g., every five seconds) 806. When the processing-scheme-based alarm status meets a certain threshold, as determined at 808, the alarm can stand down 810 and the event can be entered in the log 812. In one embodiment, the processing scheme can be an exponential decay, with a half life as specified by client 114, although other processing schemes can be used. For example, processing schemes can include a step function, where the alarm status can remain substantially constant over certain time intervals, and/or other processing schemes that can vary based on and/or over time.

In addition to the atomic alarms, the methods and systems described herein can support composite alarms, or alarm groups, as noted previously. The alarm groups can be predefined and/or can be configured by client 114. Unlike atomic alarms, alarm groups need not be event-driven. Rather, the alarm groups can combine the status of their constituent atomic alarms in defined ways to compute their own status. The composite alarms can be used as proxies for very large alarm sets to make efficient use of limited space for displaying alarms. The alarms menu of menu bar 204 in FIG. 2 can provide predefined alarm groups to facilitate hierarchy management, including the alarm groups indicated in Table 2.

TABLE 2

| Alarm group name | Alarm group definition |
|---|---|
| SINGLE PREFIX ALARM | The group of supported atomic alarms for prefix P. |
| MORE-SPECIFIC ALARMS | The group of prefix P alarms for more-specific prefixes contained with a given prefix P. |
| AGGREGATE PREFIX ALARM | The group pf alarms for a given prefix P (single prefix alarms for P, together with prefix alarms for approved more-specifics). |
| AUTONOMOUS SYSTEM ALARM | The group of prefix alarms for prefixes originated by a given autonomous system. |
| ROOT ALARM GROUP | The group of client alarms and alarm groups. |

Alarm groups can compute their status based on the individual statuses of the alarms they contain. The processing scheme used to compute the status can be selectable by client 114, according to the intended purpose of the group. Representative processing schemes can include, but are not necessarily limited to, a maximum scheme, an average scheme, and/or a weighted average scheme. For a group using an maximum scheme, the status can be computed as the highest and/or greatest status of the constituents of the group. For example, if a group of four alarms have individual computed statuses of $\{0.5, 0.2, 0.1, 0.0\}$, the status of the group as a whole would be the maximum=0.5. For a group using an average scheme, the status can be computed as the sum of the statuses of the constituents of the group divided by the number of constituents. For example, if a group of four alarms have individual computed statuses of $\{0.5, 0.2, 0.1, 0.0\}$, the average status would be $(0.5+0.2+0.1)/4=0.2$.

For a group using a weighted average scheme, the status can be computed by applying weights to the statuses of the constituents, adding the weighted statuses and dividing by the sum of the weights for normalization. The weights can be assigned by client 114. For example, in a group of four alarms, the first of which is ten times more important than the others, client 114 can assign the weights $\{10, 1, 1, 1\}$. If, at some point these four alarms have statuses of $\{0.5, 0.2, 0.1, 0.0\}$, the alarm group as a whole would have status $(10*0.5+1*0.2+1*0.1+1*0.0)/13=0.408$. It is noted that an average scheme can include a special case of a weighted average scheme, where the weights are equal. A variety of weighting schemes can be used.

Figure 9:
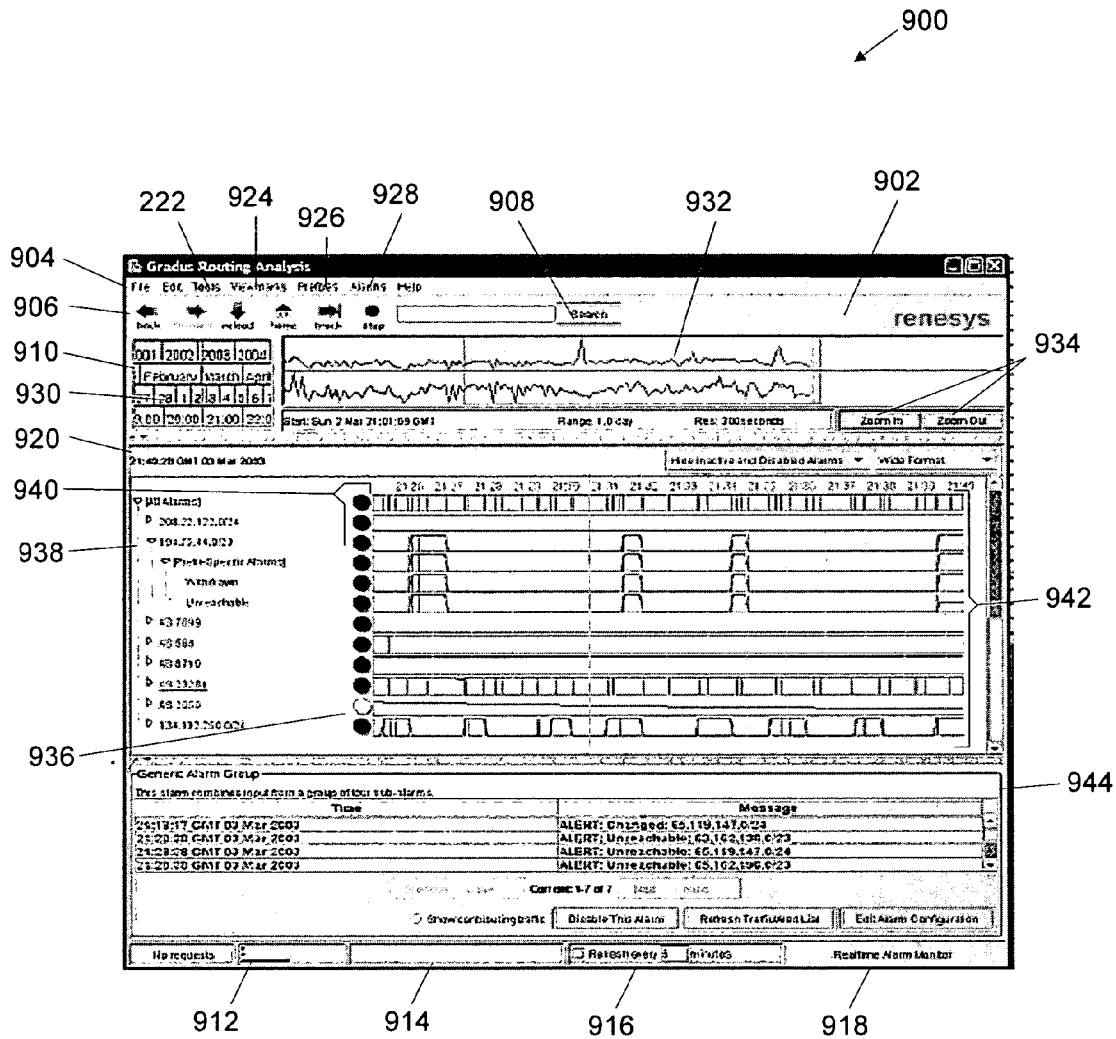
FIG. 9 illustrates an exemplary user interface for alarm monitoring and configuring.

FIG. 9 illustrates an exemplary interface 900 for configuring and displaying graphical representations of alarm data to client 114 in window 920, as chosen from Tools menu 922, or Alarms menu 928, with tool indicator 918 indicating a real-time alarm monitoring mode. Generally, interface 900 can correspond with interface 200 of FIG. 2, having persistent window control framework 902 similar to window control framework 202 of FIG. 2, such that reference numbers offset by 700 from those of FIG. 2 can refer to like features. Interface 900 is shown for illustrative purposes and other arrangements of the data and controls for manipulating and viewing the data are contemplated.

In the exemplary interface 900, the configured alarms can be displayed as a tree structure 936 adjacent to graph 938 when the real-time or historical alarm tool is started from Tools menu 922 or Alarm menu 928. Initially, tree structure 936 can display a line for each top-level prefix alarm, autonomous system alarm, or named alarm group. Client 114 can interactively expand the display to inspect the constituent alarms within the groups, down to the level of individual primitive (or atomic) alarms. Display of constituent alarms below the top level of tree structure 936 that are inactive, as well as alarms that have been manually disabled by client 114, can be suppressed, or otherwise not shown, to make more efficient use of limited screen space. As they become active, these alarms can be shown in order.

The lines of graph 938 can correspond with adjacent lines of tree structure 936. The lines of graph 938 can include status indicators 940 and plots 942 of alarm history for a time period as can be chosen using navigation buttons and/or tools 906, 910. Status indicators 940 can be colored, shaded, or otherwise distinguished to indicate various status levels. For real-time alarm monitoring, as illustrated in exemplary interface 900, window 920 can be periodically updated with the latest alarm data as processed by analysis server 110. Alarm data can be streamed similar to the streaming of routing data, as previously described, where client 114 can chose the update period using refresh selector 916.

Plots 942 can include designations for uncorrelated peer alarm "set" and "clear" events, as described with relation to FIG. 6. The designations can be colored, shaded, or otherwise distinguishable to indicate the type of event shown. The uncorrelated, low-level events can provide a good sense of the underlying routing activity contributing to changes in the evolving status of each alarm over the recent time period displayed. Set/clear indications or designations can "flow up" from constituent alarms to the alarm groups that contain them. Thus, the historical context plot for an alarm group can display the low-level set/clear events for its constituents, and its constituents' constituents, recursively.

The plot lines can show the current status of the atomic and composite alarms plotted over time. The plot lines can also be colored, shaded, or otherwise distinguished to indicate whether the alarm is an atomic alarm in alert status. When client 114 selects a given alarm from graph 938, lower frame 944 of window 920 can display additional information about the selected alarm. Client 114 can inspect the detailed alerts, as described with relation to FIG. 7, and/or the set/clear events, as described with relation to FIG. 6, that generated the observed status. The alarm groups can fuse and/or otherwise combine the alerts and low-level events from their constituent alarms for display.

In addition to displaying alarm information, Alarms menu 928 can include tools for creating and/or editing alarms configurations. For example, a prefix alarm can be created by entering a primary prefix in standard dot-decimal notation (e.g., 10.1.2.0/24). The methods and systems described herein can search the prefix advertisement history data in database 112 over a predetermined time frame and identify less specific prefixes and more specific networks. Client 114 can choose to alarm on the less specific prefixes, and can use the more specific network information for pre-configuring the DEAGGREGATION alarm for the primary prefix, and for recursive incorporation in the aggregate prefix alarm, if desired.

For AS alarms, client 114 can enter the AS number and the methods and systems described herein can search the prefix advertisement history data in database 112 over a predetermined time frame and initialize a list of prefixes originated by the AS. Alarm configurations can be edited by choosing the alarm from the graph 938 and/or tree structure 936, and selecting an edit tool.

The user interfaces that analysis server 110 can present to user 114, including the exemplary user interfaces 200, 300, 400, 500, and 900 described herein, can include hyperlinks for navigating between various interfaces. For example, the AS numbers and addresses in the listing of leading origins of instability in FIG. 2 can include hyperlinks to respective interface 500 of FIG. 5 and interface 400 of FIG. 4. By clicking-on/selecting ASN7137 in the listing of FIG. 2, the AS neighbor graph for ASN 7137, similar to graph 536 of FIG. 5, can be presented to user 114. Other data from others of the user interfaces can be similarly hyperlinked to provide for navigating among the various interfaces, and thus providing user 114 with interactive querying capabilities.

According to any of the various embodiments described above, an instability metric for a destination, e.g., a network prefix, can be determined based on the BGP updates. In a network that includes numerous destinations/network prefixes, such as a wide-area network (WAN), the Internet, etc., some of the prefixes often have a common property or characteristic. For example, certain network prefixes may be associated with a single organization such as a large corporation, a government agency, or a university. Certain network prefixes may be associated with computers and/or other network-connected devices in a particular geographic region such as a town or city, metropolitan area, district, province, county, state, country, subcontinent, continent, etc.

In various embodiments described below, the network prefixes that share a common property, and thus belong to a group are identified. By combining the instability metrics for those prefixes, determined based on the BGP updates as described above, an instability metric for a group of destinations may be computed. Advantageously, the group instability metrics can qualitatively and/or quantitatively describe the network instability with respect to an organization, a particular region, etc.

In one embodiment, the routing message data and/or the BGP update data, that are collected from several routers and/or stored in a repository of Border Gateway Protocol update traffic, are correlated in time and/or across various routers. These data may also be correlated with routing registry data, Domain Name Service (DNS) data, or both. A set (i.e., a group) of related destination network prefixes is determined based on these correlations. For example, the destination prefixes that belong to a certain organization are generally described as "originated by" in the BGP updates, and "are allocated to" in the registry data. Similarly, the destination prefixes whose traffic crosses a certain service provider are commonly described as "transited by" in the BGP updates. The destination prefixes that identify computers and other network-connected devices that are located in specific continents, countries, regions, or cities are "geolocated to" in the BGP updates.

For each network prefix in the determined set of related network prefixes (also called a group or a cluster of network prefixes), an instability metric is computed using the BGP update data. These instability metrics are combined to obtain a group instability metric. Moreover, the group instability metrics are used to update the maps and/or databases of network stability, which can indicate scores or a quantitative representation of the network instability for "slices" of the network or the for the entire network, e.g., the Internet.

To illustrate, in some embodiments, a count of network prefixes that have experienced a significant level of instability, described, for example, as the instability metric being greater than a threshold (i.e., a desired level), is obtained. In addition, a percentage of network prefixes that are determined to be experiencing instability greater than the threshold from the group of prefixes may also be computed. For example, in a group of about 7000 network prefixes that are associated with computers/devices in Illinois 700 prefixes (i.e., 10%) may be determined to be experiencing significant instability. The threshold of instability may be fixed or it may be adjusted according to the historical instability metrics for that prefix group.

Figure 10:
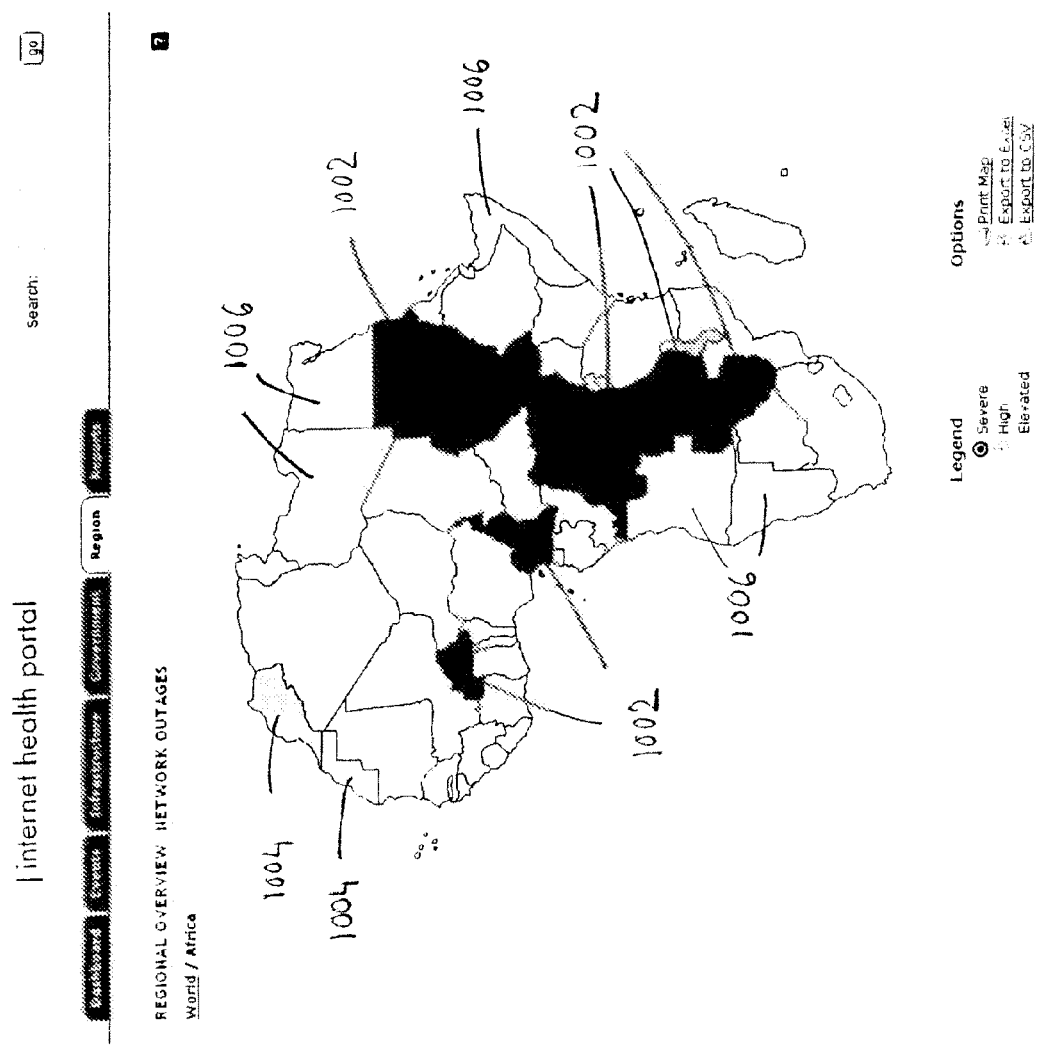
FIG. 10 depicts a map of a network slice indicating network instability associated with the network prefixes associated with various countries, according to one embodiment.

Such information (counts, percentages, weighted sums, etc.) computed for one or more groups may be used to color (e.g., green, yellow, and red) a slice of the network and/or the entire Internet. FIG. 10, for example, depicts a map of a network slice, i.e., the network prefixes in Africa. Each group of network prefixes is associated with one country in Africa. The computed group metric is current network outage, and accordingly, some countries 1002 are painted red, indicating substantial outage, some countries are painted yellow 1004, indicating a moderate level of outage, and some countries are painted green 1006, generally indicating good connectivity.

Network instability often affects groups of network prefixes in similar ways within a short timespan, for example, due to impairment to a common underlying physical path associated with the prefixes or common router in the path to/from the prefixes. In some embodiments, to analyze what a set of stability-impaired destination prefixes may have in common, a feature vector is created for each network prefix. The features in the vector may include the geolocation of the network prefix (e.g., country, city, state, postal code), the organization that registered or was assigned the network prefix, the autonomous system of one or more network service providers that originated a route to the prefix, and the autonomous systems of network service providers that provide upstream Internet transit to the prefix on behalf of the originating autonomous system.

For each network prefix whose paths are being advertised and/or withdrawn in BGP updates, an instability metric is computed. A set of network prefixes for which the computed instability metric is not within a desired range is then formed. For the prefixes in this set, the feature vectors are correlated such that a subset of prefixes having one or more common features is identified. Thus, the network prefixes in the identified subset are those affected by BGP instability at a given time, and having a common feature such as geolocation, ownership by an organization, path via a particular autonomous system, etc. As a result, the initial per-prefix instability data are transformed into a subset of instability metrics and outage events affecting particular geographic regions, registered organizations, and/or Internet service providers, etc.

Based on the subset of instability metrics and/or outage events, a group instability metric for any geographic region, registered organization, and/or Internet service provider, each of which represents a group of destination network prefixes having a particular common feature, is computed that takes into account the aggregate stability data already computed for the individual prefixes. As with single-prefix instability metrics, the computed group instability may be normalized according to the expected group instability metric value that is based on previously computed, historical values of group instability.

Figure 11A:
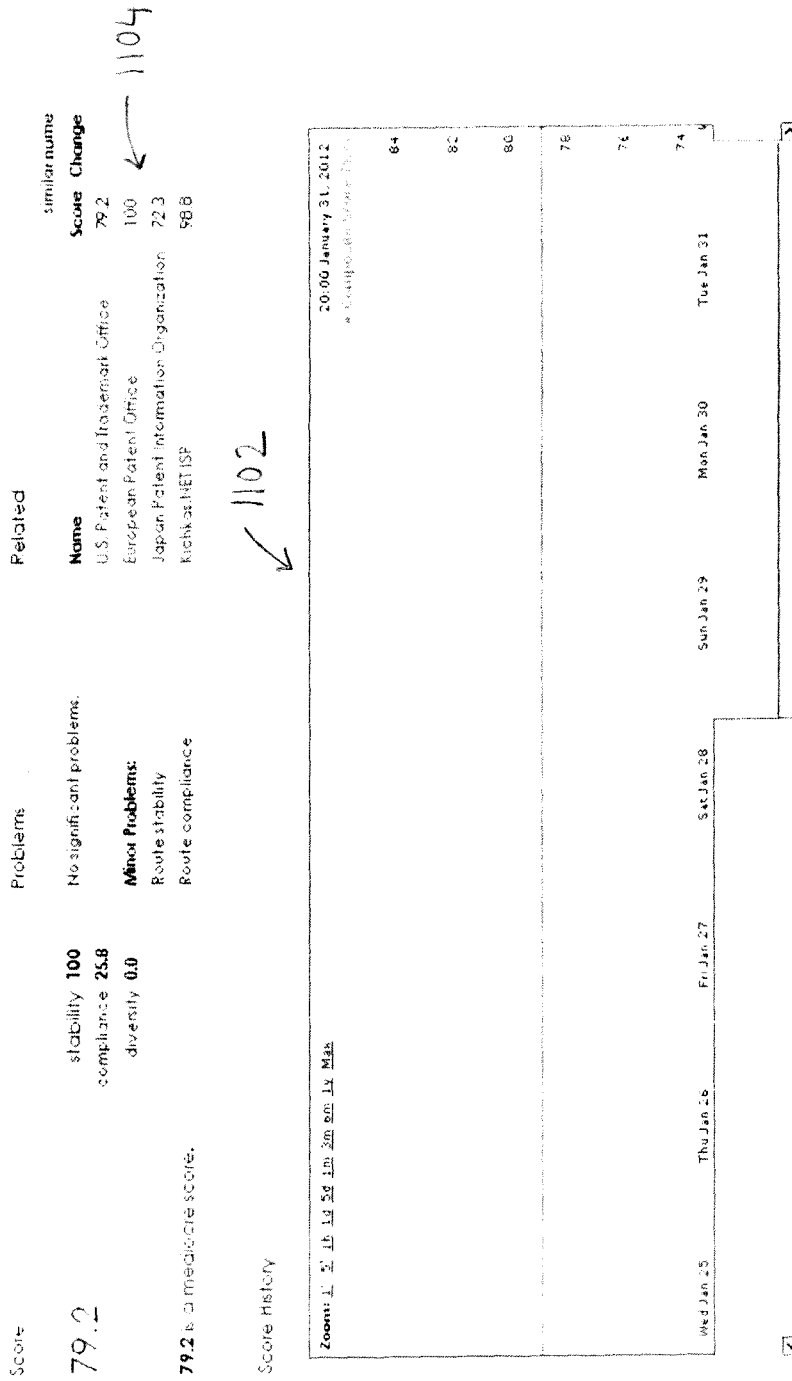
FIG. 11A depicts a history of the instability scores of one organization, according to one embodiment.

These group metrics can be represented as maps or databases of instability across a set of related prefixes, whose basis is either geographic (i.e., a geospatial map showing instability by region) or topological (e.g., a map of the instability associated with an organization, and within and between interconnected service providers). For example, FIG. 11A depicts a history 1102 of the instability scores of one organization. The instability scores of other related organizations are listed in the database 1104. The history 1102 indicates that the level of instability at the prefixes associated with the selected organization is acceptable, and also that the instability itself is substantially unchanged over a period of a few days.

Figure 11C:
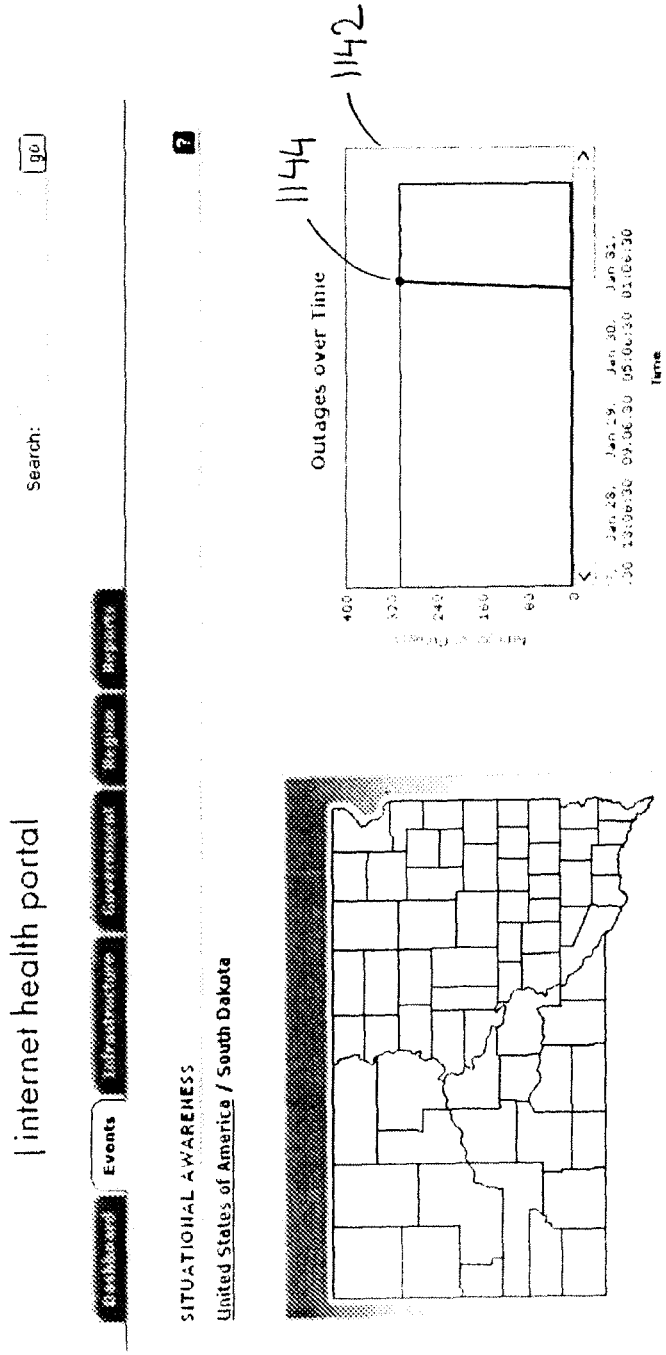
FIG. 11C depicts event analysis for a specified region, according to one embodiment.

FIG. 11B depicts instability scores 1122 for selected organizations, and changes in these scores 1124. Instability scores 1126 for selected regions such as countries and states, and changes in those scores 1128 are also shown. Event analysis and the generation of summary statistics for South Dakota (a region, in general) is described with reference to FIG. 11C. The usual number of outages, or baseline, for the group of prefixes associated with South Dakota is about zero, with a typical fluctuation of about +1. A plot 1142 of the computed number of outages for this group with reference to time (e.g., days) shows that the current (i.e., on January 31) number of outrages, shown at 1144, is 304. This number is more than a certain multiple (e.g., eight) of the typical fluctuation, representing a very high (red) threat level to the Internet connectivity from/to computers/devices located in South Dakota. A history of the computed number of outages for the group of prefixes associated with South Dakota indicates that there were three such events in the past 15 days, which may indicate a short-term problem in connectivity or a shift in the set of reachable paths from/to computers/devices located in South Dakota.

In some embodiments, other group metrics such as compliance and route diversity are computed based on the BGP updates integrated over time, and summary statistics are generated from these metrics. In computing a compliance metric, whether the observed BGP updates for a set of prefixes are more or less in agreement with the policy published by the organization associated with the set of prefixes is determined. Such a policy may be provided in a routing registry. A score based on whether the organization has expressed a routing policy in one or more registries, and on whether the observed BGP routing/updates are substantially wholly or partially consistent with any existing registrations.

In some embodiments, route diversity may be determined based on the number of independent transit providers that a selected group/set of prefixes (e.g., the prefixes associated with an organization, region, etc.) is observed to be using. In general, the more the number of independent transit provides used, the more reachable the group of network prefixes. To attain the highest route-diversity score, an individual network prefix should be reachable through at least three independent transit providers for resilience; reachablity through only one independent transit provide may be designated as suboptimal. The route-diversity scores of all of the individual prefixes in the group are summed to obtain an aggregate score for the prefix group/set. A ratio of the aggregate score and a target score, represented as percentage group score may also be provided, facilitating relative comparison of route diversity of different network prefix groups.

It is clear that there are many ways to configure the system components, interfaces and methods described herein. The disclosed methods and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network are not limited to the full Internet, and can include portions thereof. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems. Further, references herein to real-time can be understood to be abbreviations for "substantially in real-time." Although the illustrated embodiments of the methods and systems refer to certain aspects being in "real-time," such aspects may be provided in other manners.

Throughout the entirety of the present disclosure, use of the articles "a" or "an" to modify a noun can be understood to be used for convenience and to include one, or more than one of the modified noun, unless otherwise specifically stated.

Although the methods and systems have been described relative to specific embodiments thereof, they are not so limited. Obviously many modifications and variations may become apparent in light of the above teachings.

Many additional changes in the details, materials, and arrangement of parts, herein described and illustrated, can be made by those skilled in the art. Accordingly, it will be understood that the methods and systems provided herein are not to be limited to the embodiments disclosed herein, can include practices otherwise than specifically described, and are to be interpreted as broadly as allowed under the law.

What is claimed is:

1. A method for determining instability of a group of network prefixes, the method comprising:
   receiving routing message data from a plurality of routers;
   designating, based on the routing message data, routing registry data, and domain name service (DNS) data, a plurality of network prefixes as a group, each network prefix in the group having a common characteristic;
   deriving, based on the routing message data, a network prefix instability metric for each of a subset of network prefixes in the group; and
   determining a group instability metric based on the network prefix instability metrics,
   wherein the routing message data comprises border gateway protocol (BGP) updates, and
   deriving the network prefix instability metric comprises computing: (i) a rate of BGP updates associated with the network prefix, and (ii) the network prefix instability metric based on the computed rate.

2. The method of claim 1, wherein designating comprises correlating the routing message data with at least one of the routing registry data and the DNS data.

3. The method of claim 1, wherein the characteristic that is common to the network prefixes of the group comprises at least one of (i) ownership of the network prefixes by an organization, (ii) traffic associated with the network prefixes crossing a specified Internet service provider, and (iii) association of the network prefixes with computers located within a specified region.

4. The method of claim 3, wherein the associated traffic comprises at least one of traffic originated from the network prefixes and traffic directed to the network prefixes.

5. The method of claim 3, wherein the specified region comprises a city, a metropolitan area, a district, a province, a state, a country, a subcontinent, and a continent.

6. A method for determining instability of a network subset, the network comprising a plurality of network prefixes, the method comprising:
  associating a feature vector with each network prefix in the network;
  receiving routing message data from a plurality of routers, wherein the routing message data comprises border gateway protocol (BGP) updates;
  computing, based on the routing message data, a network prefix instability metric for each network prefix in a set of network prefixes in the network;
  selecting a first subset of network prefixes, such that for each network prefix in the first subset the network prefix instability metric is substantially different than a specified value associated with the network prefix;
  correlating the feature vectors associated with each network prefix in the first subset to obtain a second subset of network prefixes; and
  determining a network-subset instability based on the network prefix instability of the network prefixes in the second subset,
  wherein computing the network prefix instability metric for each network prefix comprises computing: (i) a rate of BGP updates associated with the network prefix, and (ii) the network prefix instability metric based on the computed rate.

7. The method of claim 6, wherein the feature vector comprises at least one of: (i) a geolocation of the network prefix, (ii) an organization associated with the network prefix, (iii) a first set of autonomous systems of network service providers that originated a route to the network prefix, and (iv) a second set of autonomous systems of network service providers that provide upstream Internet transit to the network prefix.

8. The method of claim 7, wherein the geolocation is selected from the group consisting of a postal code, a city, a state, and a country.

9. The method of claim 6, further comprising generating an event based on the determined network-subset instability, the event indicating instability of network prefixes having a common property.

10. The method of claim 9, wherein the common property is at least one of (i) ownership of the network prefixes by an organization, (ii) traffic associated with the network prefixes crossing a specified Internet service provider, and (iii) association of the network prefixes with computers located within a specified region.

11. The method of claim 6, wherein the specified value associated with the network prefix is based on historical network prefix instability metrics of that network prefix.

12. The method of claim 6, wherein network-subset instability is represented as at least one of a map and a database.

13. The method of claim 6, wherein the network prefix instability metric is selected from the group consisting of a compliance metric and a route-diversity metric.

* * * * *